US012724569B2

(12) United States Patent
Tsuji et al.

(10) Patent No.: US 12,724,569 B2
(45) Date of Patent: Sep. 1, 2026

(54) SEMICONDUCTOR MEMORY DEVICE WITH FEATURE REGISTERS FOR STORING PARAMETER DATA

(71) Applicant: Kioxia Corporation, Tokyo (JP)

(72) Inventors: Nobuhiro Tsuji, Yokohama (JP); Akihiro Fukushima, Yokohama (JP)

(73) Assignee: Kioxia Corporation, Tokyo (JP)

( * ) Notice: Subject to any disclaimer, the term of this patent is extended or adjusted under 35 U.S.C. 154(b) by 2 days.

(21) Appl. No.: 18/974,070

(22) Filed: Dec. 9, 2024

(65) Prior Publication Data

US 2025/0291517 A1 Sep. 18, 2025

(30) Foreign Application Priority Data

Mar. 18, 2024 (JP) ................................ 2024-042719

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ....... G06F 3/0604; G06F 3/0659; G06F 3/067
See application file for complete search history.

(56) References Cited

U.S. PATENT DOCUMENTS 11,537,537 B2 12/2022 Suzuki
2018/0075910 A1* 3/2018 Seong ................ G11C 16/3436
2018/0204619 A1 7/2018 Futatsuyama et al.
2019/0391758 A1* 12/2019 Fujiu .................. G11C 16/0483
2021/0026565 A1* 1/2021 Her ...................... G11C 15/046
2021/0303210 A1 9/2021 Kanagawa
2023/0152993 A1* 5/2023 Oh ........................ G06F 3/0673 711/154
2023/0350805 A1 11/2023 Golla et al.
2024/0004581 A1* 1/2024 Lu ......................... G06F 3/0679

FOREIGN PATENT DOCUMENTS

CN 104750584 A 7/2015

* cited by examiner

*Primary Examiner* — Jane W Benner

(74) *Attorney, Agent, or Firm* — Oblon, McClelland, Maier & Neustadt, L.L.P.

(57) ABSTRACT

According to one embodiment, a semiconductor memory device includes a terminal group, a first device, and a second device. The first device includes a first register group to which a first address space is mapped and a memory cell array. The second device is provided between the terminal group and the first device. The second device includes a second register group. The second register group includes multiple pages to which common second address spaces exclusive of the first address space are mapped. When the second device receives a command sequence of a setting command, the second device identifies, based on the command sequence of the setting command, a storage destination page of parameter data from among the multiple pages when an address included in the command sequence of the setting command is a first value.

20 Claims, 27 Drawing Sheets

SYS
CP0-0 (LUN0)
CP0-1 (LUN1)
CP0-2 (LUN2)
CP0-3 (LUN3)
CP1-0 (LUN4)
CP1-1 (LUN5)
CP1-2 (LUN6)
CP1-3 (LUN7)
MEMORY CHIP
MCH0
MCH1
IFC
INTERFACE CHIP
HCH
MC
MEMORY CONTROLLER

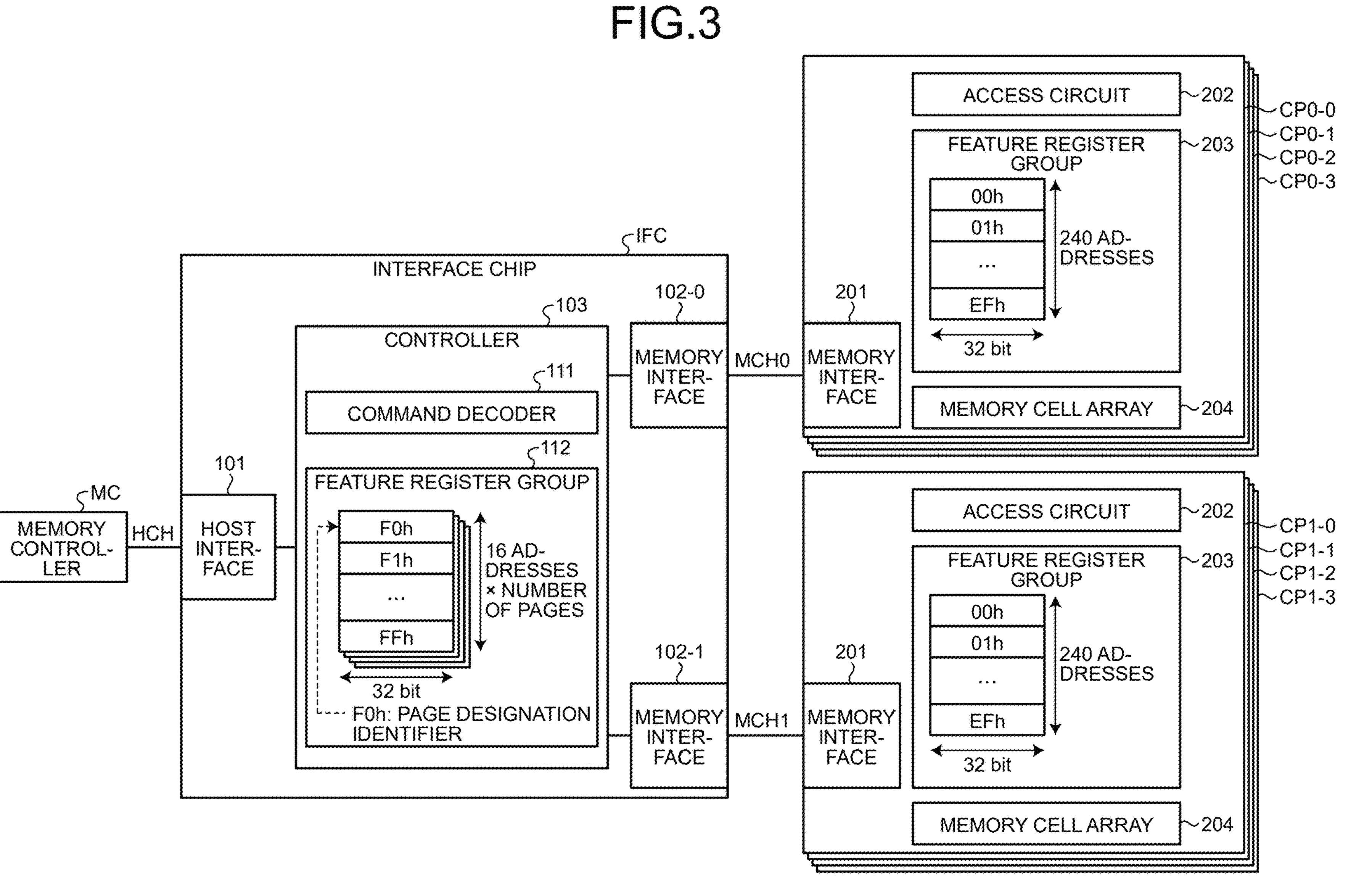
FIG.3
MC
MEMORY CONTROL-LER
HCH
101
HOST INTER-FACE
IFC
INTERFACE CHIP
103
CONTROLLER
111
COMMAND DECODER
112
FEATURE REGISTER GROUP
F0h
F1h
...
FFh
16 AD-DRESSES × NUMBER OF PAGES
32 bit
F0h: PAGE DESIGNATION IDENTIFIER
102-0
MEMORY INTER-FACE
102-1
MEMORY INTER-FACE
MCH0
MCH1
201
MEMORY INTER-FACE
ACCESS CIRCUIT
202
FEATURE REGISTER GROUP
203
00h
01h
...
EFh
240 AD-DRESSES
32 bit
MEMORY CELL ARRAY
204
CP0-0
CP0-1
CP0-2
CP0-3
201
MEMORY INTER-FACE
ACCESS CIRCUIT
202
FEATURE REGISTER GROUP
203
00h
01h
...
EFh
240 AD-DRESSES
32 bit
MEMORY CELL ARRAY
204
CP1-0
CP1-1
CP1-2
CP1-3

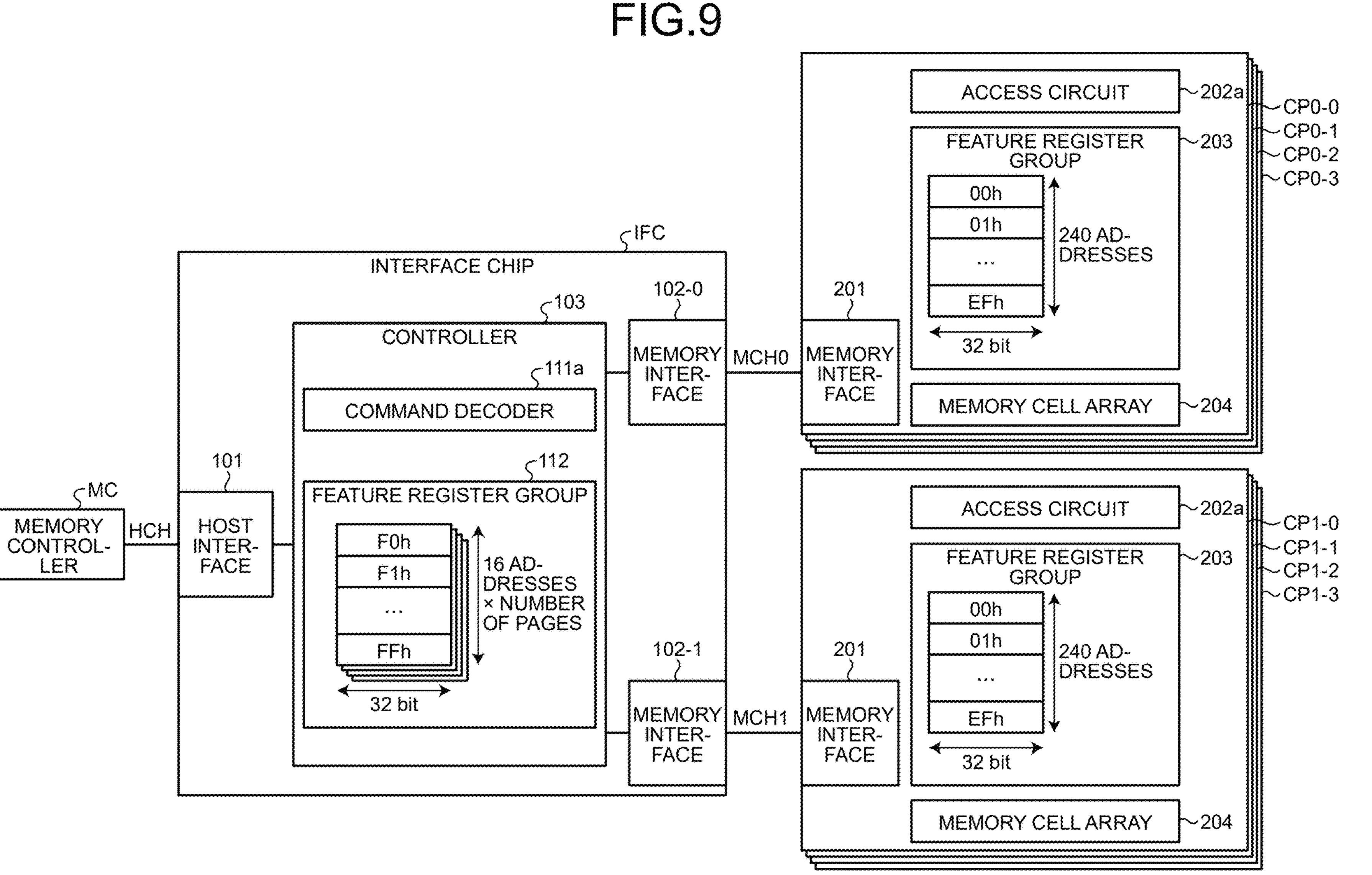
FIG.9
MC
MEMORY CONTROL-LER
HCH
101
HOST INTER-FACE
IFC
INTERFACE CHIP
103
CONTROLLER
111a
COMMAND DECODER
112
FEATURE REGISTER GROUP
F0h
F1h
...
FFh
16 AD-DRESSES × NUMBER OF PAGES
32 bit
102-0
MEMORY INTER-FACE
102-1
MEMORY INTER-FACE
MCH0
MCH1
201
MEMORY INTER-FACE
ACCESS CIRCUIT
202a
FEATURE REGISTER GROUP
203
00h
01h
...
EFh
240 AD-DRESSES
32 bit
MEMORY CELL ARRAY
204
CP0-0
CP0-1
CP0-2
CP0-3
201
MEMORY INTER-FACE
ACCESS CIRCUIT
202a
FEATURE REGISTER GROUP
203
00h
01h
...
EFh
240 AD-DRESSES
32 bit
MEMORY CELL ARRAY
204
CP1-0
CP1-1
CP1-2
CP1-3

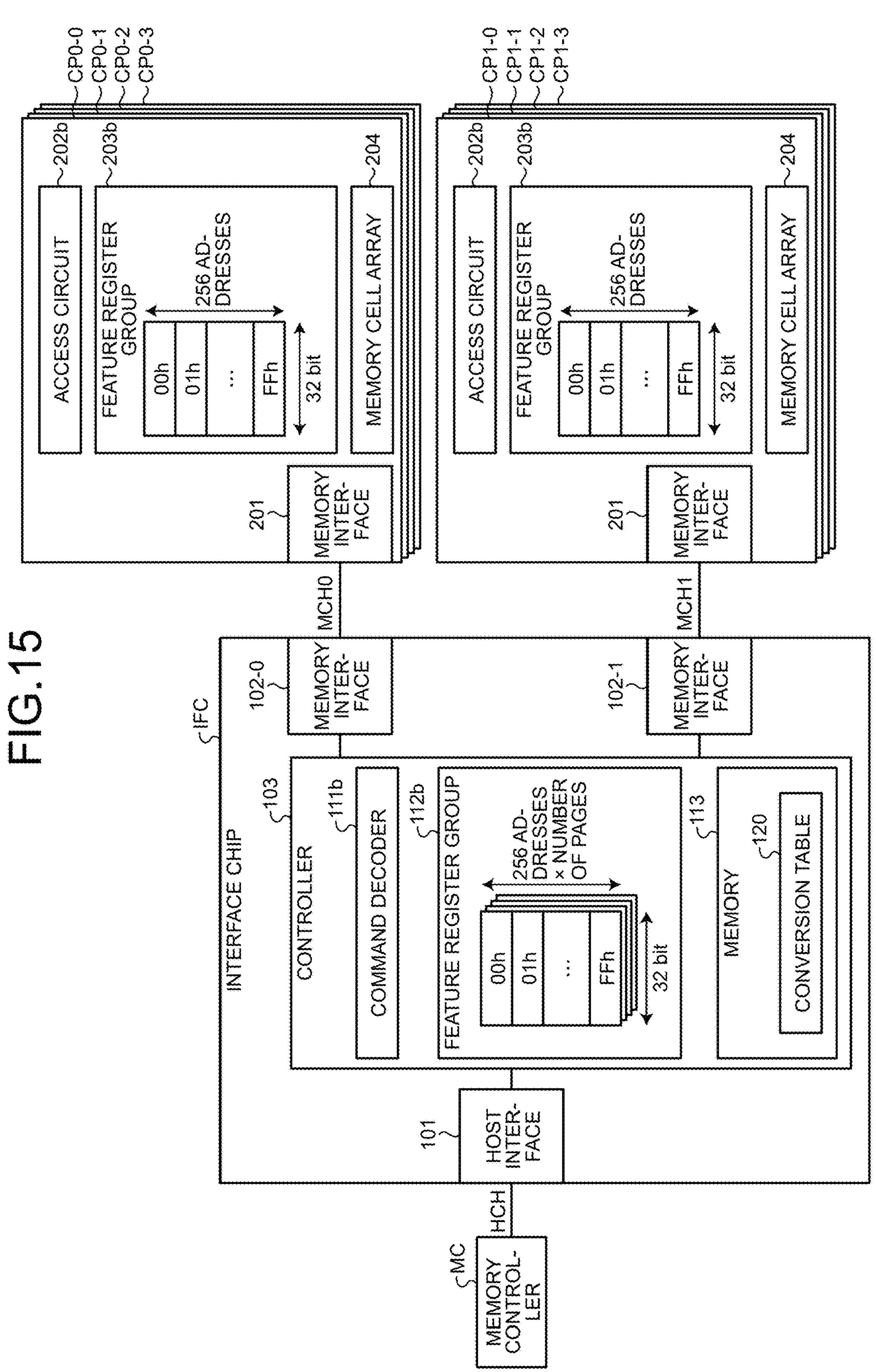
FIG.15
CP0-0
CP0-1
CP0-2
CP0-3
202b
ACCESS CIRCUIT
203b
FEATURE REGISTER GROUP
256 AD-DRESSES
00h
01h
...
FFh
32 bit
204
MEMORY CELL ARRAY
201
MEMORY INTER-FACE
CP1-0
CP1-1
CP1-2
CP1-3
202b
ACCESS CIRCUIT
203b
FEATURE REGISTER GROUP
256 AD-DRESSES
00h
01h
...
FFh
32 bit
204
MEMORY CELL ARRAY
201
MEMORY INTER-FACE
MCH0
MCH1
IFC
INTERFACE CHIP
102-0
MEMORY INTER-FACE
102-1
MEMORY INTER-FACE
103
CONTROLLER
111b
COMMAND DECODER
112b
FEATURE REGISTER GROUP
256 AD-DRESSES × NUMBER OF PAGES
00h
01h
...
FFh
32 bit
113
MEMORY
120
CONVERSION TABLE
101
HOST INTER-FACE
HCH
MC
MEMORY CONTROL-LER

120

| SECOND ADDRESS | PAGE NUMBER |
|---|---|
| 10h | 1 |
| 11h | 2 |
| ... | ... |

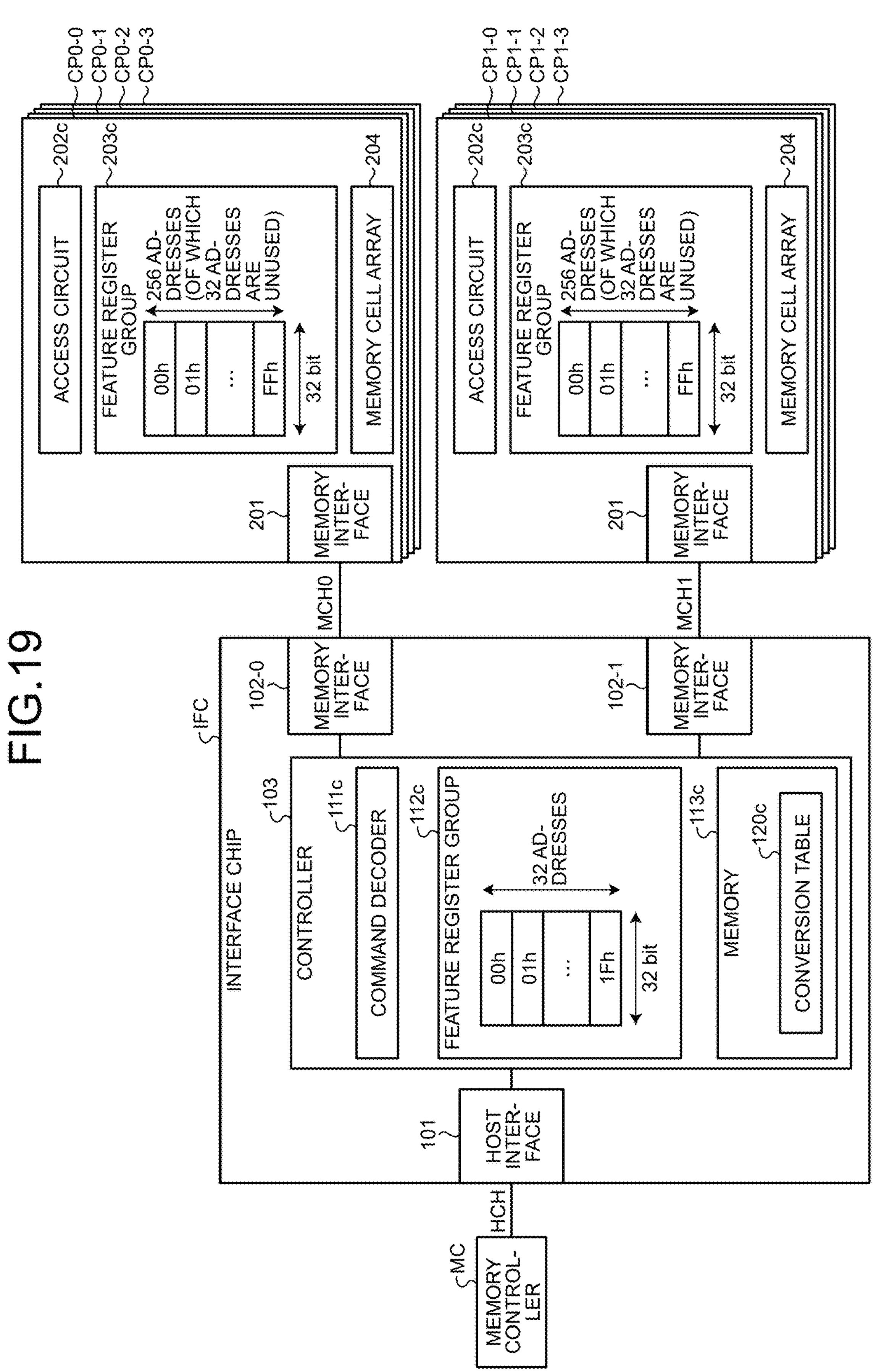
FIG.19
CP0-0
CP0-1
CP0-2
CP0-3
202c
ACCESS CIRCUIT
203c
FEATURE REGISTER GROUP
256 AD-DRESSES (OF WHICH 32 AD-DRESSES ARE UNUSED)
00h
01h
...
FFh
32 bit
204
MEMORY CELL ARRAY
201
MEMORY INTER-FACE
MCH0
CP1-0
CP1-1
CP1-2
CP1-3
202c
ACCESS CIRCUIT
203c
FEATURE REGISTER GROUP
256 AD-DRESSES (OF WHICH 32 AD-DRESSES ARE UNUSED)
00h
01h
...
FFh
32 bit
204
MEMORY CELL ARRAY
201
MEMORY INTER-FACE
MCH1
IFC
INTERFACE CHIP
102-0
MEMORY INTER-FACE
102-1
MEMORY INTER-FACE
103
CONTROLLER
111c
COMMAND DECODER
112c
FEATURE REGISTER GROUP
32 AD-DRESSES
00h
01h
...
1Fh
32 bit
113c
MEMORY
120c
CONVERSION TABLE
101
HOST INTER-FACE
HCH
MC
MEMORY CONTROL-LER

| FIRST ADDRESS | INTERFACE FEATURE ADDRESS |
| --- | --- |
| 80h | 00h |
| A2h | 01h |
| … | … |
| F3h | 1Fh |

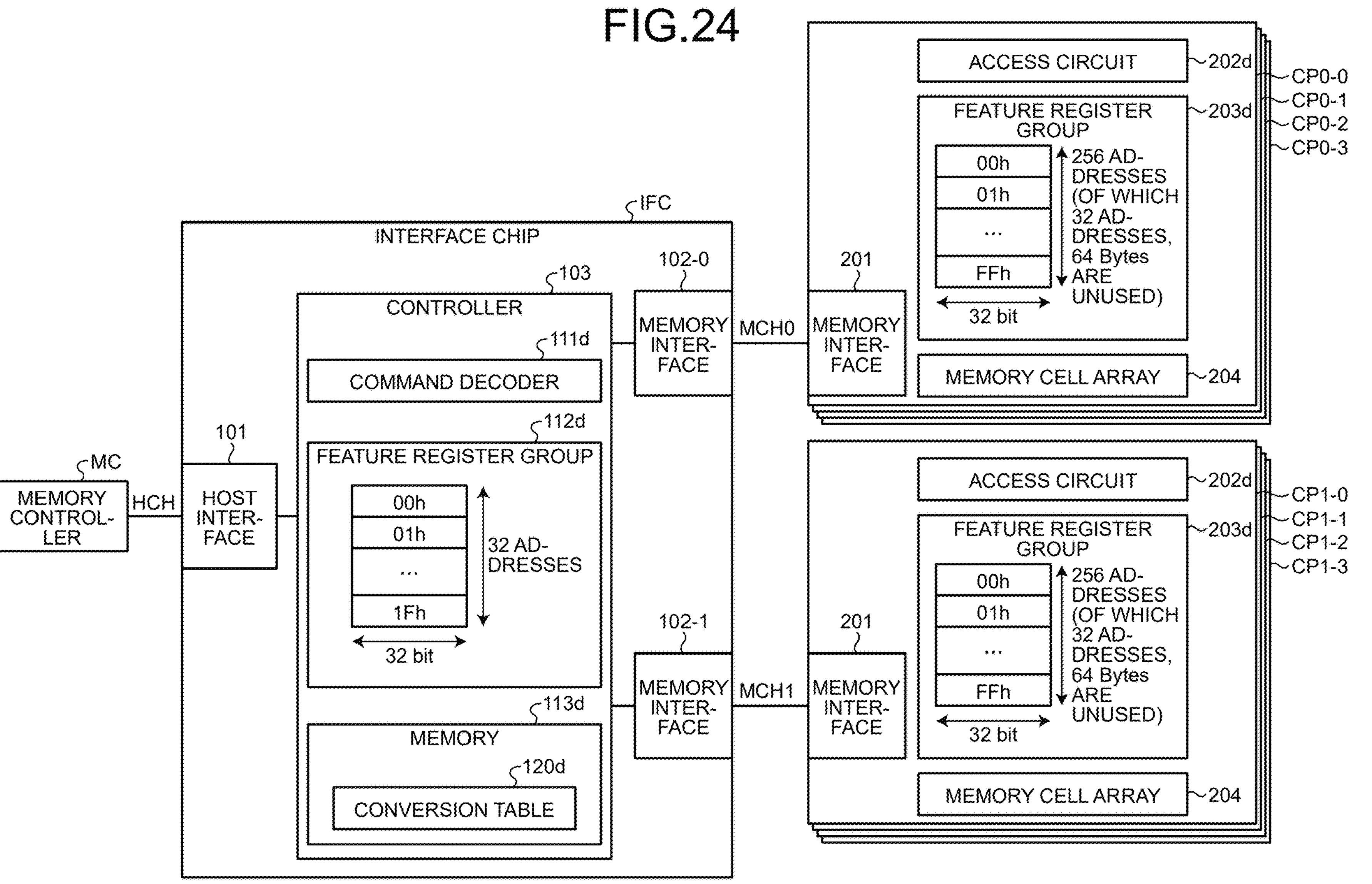
FIG.24
MC
MEMORY CONTROL-LER
HCH
101
HOST INTER-FACE
IFC
INTERFACE CHIP
103
CONTROLLER
111d
COMMAND DECODER
112d
FEATURE REGISTER GROUP
00h
01h
...
1Fh
32 AD-DRESSES
32 bit
113d
MEMORY
120d
CONVERSION TABLE
102-0
MEMORY INTER-FACE
MCH0
102-1
MEMORY INTER-FACE
MCH1
201
MEMORY INTER-FACE
ACCESS CIRCUIT
202d
FEATURE REGISTER GROUP
203d
00h
01h
...
FFh
256 AD-DRESSES (OF WHICH 32 AD-DRESSES, 64 Bytes ARE UNUSED)
32 bit
MEMORY CELL ARRAY
204
CP0-0
CP0-1
CP0-2
CP0-3
201
MEMORY INTER-FACE
ACCESS CIRCUIT
202d
FEATURE REGISTER GROUP
203d
00h
01h
...
FFh
256 AD-DRESSES (OF WHICH 32 AD-DRESSES, 64 Bytes ARE UNUSED)
32 bit
MEMORY CELL ARRAY
204
CP1-0
CP1-1
CP1-2
CP1-3

120d

| FIRST ADDRESS | INTERFACE FEATURE ADDRESS | B0 | B1 | B2 | B3 |
|---|---|---|---|---|---|
| 80h | 00h | 0 | 0 | 1 | 1 |
| A2h | 01h | 1 | 0 | 0 | 1 |
| ... | ... | ... | ... | ... | ... |
| F3h | 1Fh | 0 | 0 | 1 | 0 |

32 ADDRESSES

USABLE: 64 Bytes

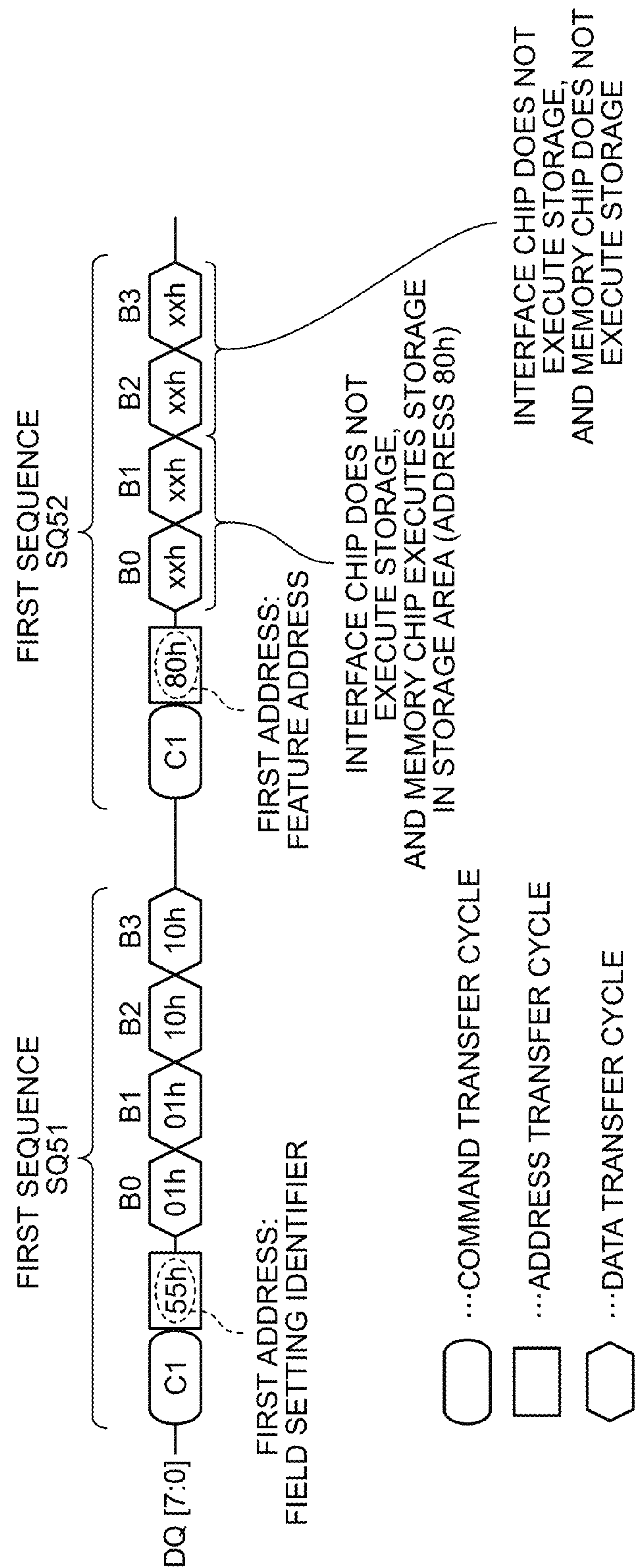
FIG.28
DQ [7:0]
FIRST SEQUENCE
SQ51
C1
55h
B0
01h
B1
01h
B2
10h
B3
10h
FIRST ADDRESS:
FIELD SETTING IDENTIFIER
FIRST SEQUENCE
SQ52
C1
80h
B0
xxh
B1
xxh
B2
xxh
B3
xxh
FIRST ADDRESS:
FEATURE ADDRESS
INTERFACE CHIP DOES NOT EXECUTE STORAGE, AND MEMORY CHIP EXECUTES STORAGE IN STORAGE AREA (ADDRESS 80h)
INTERFACE CHIP DOES NOT EXECUTE STORAGE, AND MEMORY CHIP DOES NOT EXECUTE STORAGE
…COMMAND TRANSFER CYCLE
…ADDRESS TRANSFER CYCLE
…DATA TRANSFER CYCLE

SEMICONDUCTOR MEMORY DEVICE WITH FEATURE REGISTERS FOR STORING PARAMETER DATA

CROSS-REFERENCE TO RELATED APPLICATIONS

This application is based upon and claims the benefit of priority from Japanese Patent Application No. 2024-042719, filed on Mar. 18, 2024, the entire contents of which are incorporated herein by reference.

FIELD

Embodiments described herein relate generally to a semiconductor memory device, a memory system, and a method.

BACKGROUND

There is a semiconductor memory device in which a semiconductor integrated circuit called an interface chip is provided between a plurality of memory chips and an external terminal group that is connected to an external controller (hereinafter referred to as a memory controller). In such a semiconductor memory device, data transfer between the memory controller and the memory chips is performed via the interface chip. Since the load of the transmission line is distributed by the interface chip, the memory system can operate at high speed even when a large number of memory chips are provided.

As with the memory chip, the interface chip includes a feature register group that is a register used for functional setting. Parameter data is stored in each of the feature register group included in the memory chip and the feature register group included in the interface chip by using common specific commands.

BRIEF DESCRIPTION OF THE DRAWINGS

FIG. 3 is a diagram for describing an example of a configuration of the interface chip and each of the memory chips according to the first embodiment;

FIG. 9 is a diagram for describing an example of a configuration of the interface chip and each of the memory chips according to a second embodiment;

FIG. 15 is a diagram for describing an example of a configuration of the interface chip and each of the memory chips according to the third embodiment;

FIG. 19 is a diagram for describing an example of a configuration of the interface chip and each of the memory chips according to a fourth embodiment;

FIG. 20 is a diagram illustrating an example of a configuration of a conversion table according to the fourth embodiment;

FIG. 24 is a diagram for describing an example of a configuration of the interface chip and each of the memory chips according to a fifth embodiment;

FIG. 28 is another diagram for describing a method of setting parameter data according to the fifth embodiment using the first sequence;

DETAILED DESCRIPTION

According to one embodiment, a semiconductor memory device includes a terminal group, a first device, and a second device. To the terminal group, a command sequence of a setting command is input. The command sequence includes an address. The first device includes a first register group to which a first address space is mapped and a memory cell array. The first device is configured to store parameter data in the first register group when the address is included in the first address space, and store no parameter data in the first register group when the address is not included in the first address space. The second device is provided between the terminal group and the first device. The second device includes a second register group. The second register group includes multiple pages to which common second address spaces exclusive of the first address space are mapped. The second device is configured to identify, based on the command sequence, a storage destination page of parameter data from among the multiple pages when the address is a first value.

Exemplary embodiments of a semiconductor memory device, a memory system, and a method will be described below in detail with reference to the accompanying drawings. The present invention is not limited to the following embodiments.

First Embodiment

Figure 1:
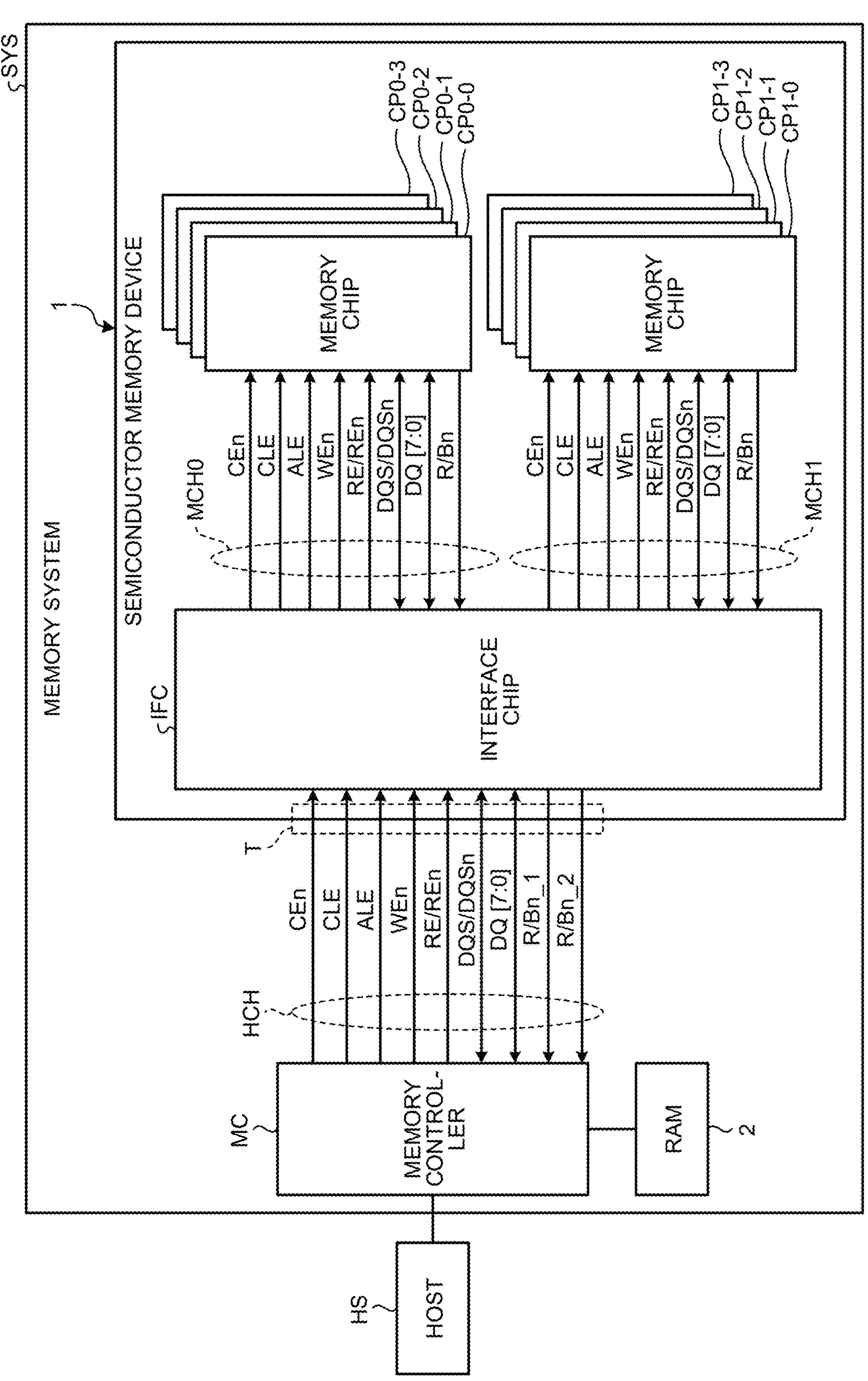
FIG. 1 is a schematic diagram illustrating an example of a configuration of a memory system according to a first embodiment.

FIG. 1 is a schematic diagram illustrating an example of a configuration of a memory system SYS according to a first embodiment.

The memory system SYS can be connected to a host HS. A standard to which a communication path connecting the host HS and the memory system SYS and to which communication via the communication path conforms are not limited to a specific standard. The host HS is, for example, a personal computer, a portable digital assistant, or a server. When the host HS accesses the memory system SYS, the host HS transmits an access command to the memory system SYS. The access command includes a write command, a read command, or the like.

The memory system SYS includes a semiconductor memory device 1, a memory controller MC, and a random-access memory (RAM) 2.

The memory controller MC is a control device that controls the semiconductor memory device 1. As part of the control over the semiconductor memory device 1, the memory controller MC executes data transfer between the host HS and the semiconductor memory device 1 in response to an access command from the host HS.

The RAM 2 provides the memory controller MC with functions such as a buffer area, a cache area, and an area into which a program is loaded. The memory controller MC can buffer, into the RAM 2, the data transferred between the host HS and the semiconductor memory device 1. In addition, the memory controller MC loads a firmware program into the RAM 2 to execute the program, or buffers or caches various types of management data in the RAM 2. Note that, in the example illustrated in FIG. 1, the RAM 2 is provided outside the memory controller MC. The RAM 2 may be incorporated in the memory controller MC.

The semiconductor memory device 1 includes a terminal group T, an interface chip IFC, and a plurality of memory chips CP0-0 to CP0-3 and CP1-0 to CP1-3. The interface chip IFC is provided between the terminal group T and the memory chips CP0-0 to CP0-3 and CP1-0 to CP1-3.

Each of the memory chips CP0-0 to CP0-3 and CP1-0 to CP1-3 is, for example, a memory chip of a nonvolatile memory such as a NAND-type flash memory. Here, it is assumed that each of the memory chips CP0-0 to CP0-3 and CP1-0 to CP1-3 is a memory chip of a NAND-type flash memory.

The semiconductor memory device 1 can be implemented as a multi chip package (MCP) in which the memory chips CP0-0 to CP0-3 and the memory chips CP1-0 to CP1-3 are stacked. In a case where the semiconductor memory device 1 is implemented as the MCP, in the semiconductor memory device 1, the periphery of the interface chip IFC and the memory chips CP0-0 to CP0-3 and CP1-0 to CP1-3 may be sealed with a mold resin.

In addition, the semiconductor memory device 1 includes a plurality of channels connecting the memory chips CP0-0 to CP0-3 and CP1-0 to CP1-3 to the interface chip IFC. Each of the channels is referred to as a memory channel MCH in the sense of a channel connecting the NAND-type flash memory.

In the example of FIG. 1, as the memory channels MCH, the semiconductor memory device 1 includes memory channels MCH0 and MCH1. The four memory chips CP0-0 to CP0-3 are connected to the interface chip IFC via the memory channel MCH0, and the four memory chips CP1-0 to CP1-3 are connected to the interface chip IFC via the memory channel MCH1.

Each memory channel MCH is configured based on a predetermined standard. In a case where each of the memory chips CP0-0 to CP0-3 and CP1-0 to CP1-3 is a NAND-type flash memory, the predetermined standard is, for example, a toggle DDR standard.

Note that the number of memory chips CP included in the semiconductor memory device 1 is not limited to eight. The number of memory channels MCH connecting the interface chip IFC and the memory chips CP is not limited to two.

Note that each of the memory chips CP0-0 to CP0-3 and CP1-0 to CP1-3 is an example of the first device. The interface chip IFC is an example of the second device.

Each of the memory chips CP0-0 to CP0-3 and CP1-0 to CP1-3 may be hereinafter referred to as a memory chip CP.

The semiconductor memory device 1 is connected to the memory controller MC via one channel. This one channel is referred to as a host channel HCH in the sense of a channel on the host side as viewed from the interface chip IFC.

The host channel HCH is configured based on a predetermined standard. In a case where each of the memory chips CP is a NAND-type flash memory, the predetermined standard is, for example, a toggle DDR standard.

The host channel HCH includes a signal line for transferring a chip enable signal CEn, a signal line for transferring a command latch enable signal CLE, a signal line for transferring an address latch enable signal ALE, a signal line for transferring a write enable signal WEn, a signal line for transferring a read enable signal RE/REn, a signal line for transferring a data strobe signal DQS/DQSn, a signal line for transferring a data signal DQ(7:0) having a predetermined bit width (here, a width of 8 bits as an example), a signal line for transferring a ready/busy signal R/Bn_1, and a signal line for transferring a ready/busy signal R/Bn_2. Note that "n" added to the end of a reference numeral representing a signal indicates that the signal is operated by negative logic. Whether each signal is operated by negative logic or positive logic can be optionally designed.

The chip enable signal CEn is a signal for setting the memory chip CP to be accessed to an enable state. The data strobe signal DQS/DQSn is a signal for instructing a counterpart device to capture data transmitted by the data signal DQ(7:0). The data strobe signal DQS/DQSn is a differential signal constituted by the data strobe signal DQS and the data strobe signal DQSn. The command latch enable signal CLE is a signal indicating that the data signal DQ(7:0) is a command. The address latch enable signal ALE is a signal indicating that the data signal DQ(7:0) is an address. The write enable signal WEn is a signal for instructing the counterpart device to capture a command or an address transmitted by the data signal DQ(7:0). The read enable signal RE/REn is a signal for instructing the counterpart device to output the data signal DQ(7:0). The read enable signal RE/REn is a differential signal constituted by a read enable signal RE and a read enable signal REn. The ready/busy signal R/Bn_1 and the ready/busy signal R/Bn_2 are signals indicating a ready state in which reception of a command is waited for or a busy state in which a command cannot be executed even if the command is received. Note that the configuration of the signal line for transferring the ready/busy signal R/Bn included in the host channel HCH is not limited to the above-described example. For example, with respect to the ready/busy signal R/Bn, the host channel HCH may include one signal line for transferring one ready/busy signal R/Bn generated by wired OR connection or the like from the ready/busy signal R/Bn related to the memory channel MCH0 and the ready/busy signal R/Bn related to the memory channel MCH1.

Each of the memory channels MCH0 and MCH1 can transmit and receive a signal group of the same type as the signal group of the host channel HCH. Specifically, each of the memory channels MCH0 and MCH1 includes a signal line for transferring the chip enable signal CEn, a signal line for transferring the command latch enable signal CLE, a signal line for transferring the address latch enable signal ALE, a signal line for transferring the write enable signal WEn, a signal line for transferring the read enable signal RE/REn, a signal line for transferring the data strobe signal DQS/DQSn, a signal line group for transferring the data signal DQ(7:0), and a signal line for transferring the ready/busy signal R/Bn.

Figure 2:
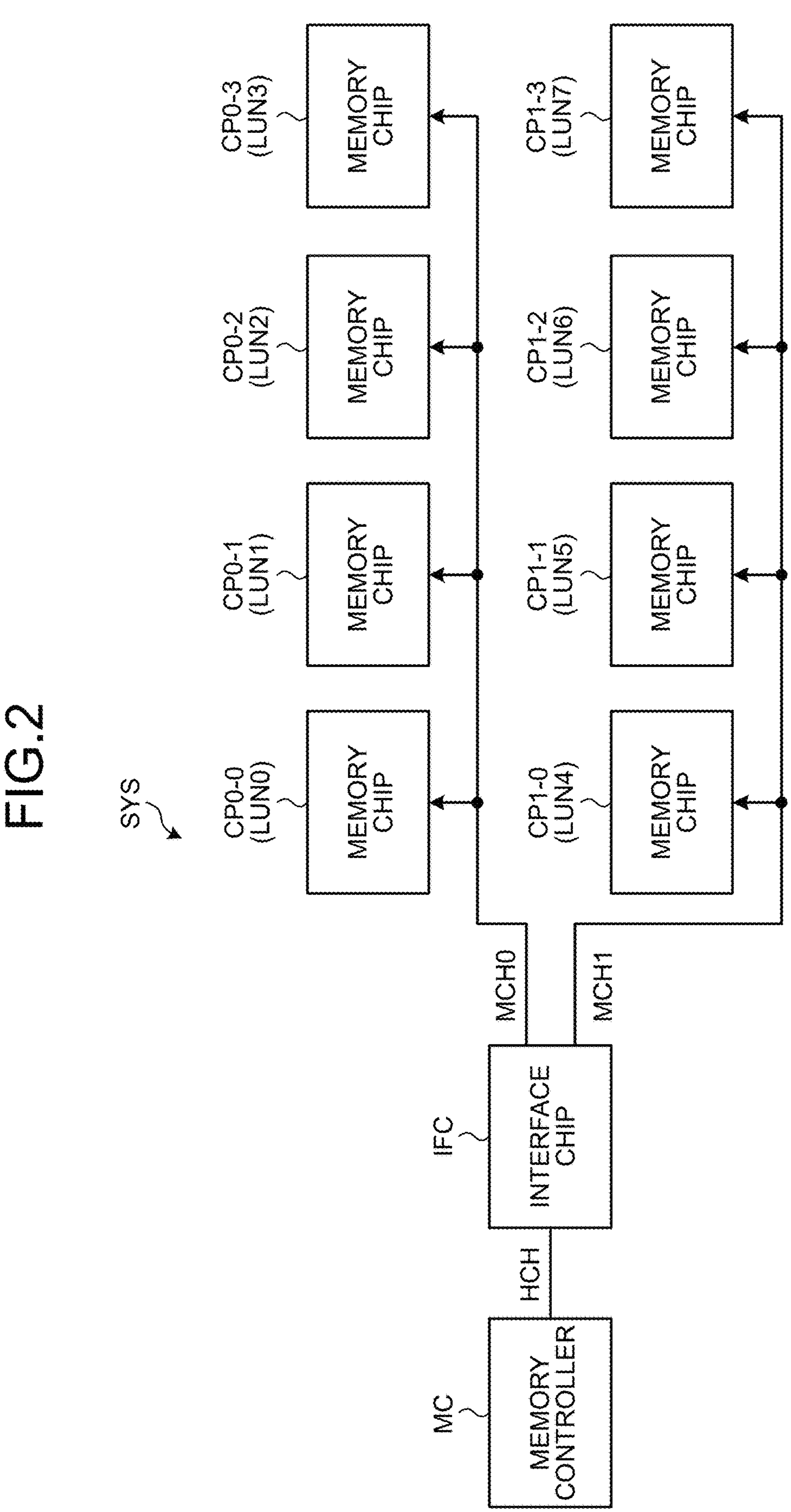
FIG. 2 is a schematic diagram for describing a more detailed connection relationship between an interface chip and each of memory chips according to the first embodiment.

FIG. 2 is a schematic diagram for describing a more detailed connection relationship between the interface chip IFC and each of the memory chips CP according to the first embodiment.

As illustrated in FIG. 2, the four memory chips CP0-0 to CP0-3 are connected in common to the memory channel MCH0. Similarly, the four memory chips CP1-0 to CP1-3 are connected in common to the memory channel MCH1.

Note that the memory chips CP0-0 to CP0-3 and CP1-0 to CP1-3 may not be connected in common to all the signal lines constituting the corresponding memory channel MCH. The memory chips CP0-0 to CP0-3 and CP1-0 to CP1-3 may be configured such that some of the signal lines constituting the corresponding memory channels MCH other than the signal lines for transferring the data signal DQ(7:0) connect the interface chip IFC and the individual memory chips CP on a one to-one basis.

The interface chip IFC can execute data transfer via the memory channel MCH0 and data transfer via the memory channel MCH1, independently of each other. The host channel HCH connecting the memory controller MC and the interface chip IFC is controlled to prevent a delay in data transfer in the interface chip IFC even when the data transfer via the memory channel MCH0 and the data transfer via the memory channel MCH1 are executed in parallel. Therefore, the host channel HCH can transfer data at a transfer rate obtained by combining the transfer rate of the memory channel MCH0 and the transfer rate of the memory channel MCH1. In other words, the host channel HCH can transfer data at a transfer rate twice that of the memory channel MCH.

Each of the memory chips CP is given a logical unit number (LUN) that is a unique identification number in the semiconductor memory device 1. The memory controller MC stores in advance the relationship between the LUN given to each of the memory chips CP and the memory channel MCH to which the memory chip CP is connected. Specifically, in the example illustrated in FIG. 2, the memory controller MC stores (or recognizes) in advance that, LUN0 is given to the memory chip CP0-0, LUN1 is given to the memory chip CP0-1, LUN2 is given to the memory chip CP0-2, LUN3 is given to the memory chip CP0-3, LUN4 is given to the memory chip CP1-0, LUN5 is given to the memory chip CP1-1, LUN6 is given to the memory chip CP1-2, and LUN7 is given to the memory chip CP1-3.

FIG. 3 is a diagram for describing an example of the configuration of the interface chip IFC and each of the memory chips CP according to the first embodiment. The memory chips CP0-0 to CP0-3 and CP1-0 to CP1-3 have a common configuration. In this figure, the configurations of the memory chips CP0-0 and CP1-0 are illustrated as representatives of the memory chips CP0-0 to CP0-3 and CP1-0 to CP1-3, and the configurations of the other memory chips CP are not illustrated.

The interface chip IFC includes a host interface 101, two memory interfaces 102, and a controller 103.

The host interface 101 is a PHY circuit that transmits and receives electrical signals to and from the host HA via the host channel HCH.

The memory interface 102-0 of the two memory interfaces 102 is a PHY circuit that transmits and receives electrical signals to and from the four memory chips CP0-1 to CP0-3 via the memory channel MCH0. The memory interface 102-1 of the two memory interfaces 102 is a PHY circuit that transmits and receives electrical signals to and from the four memory chips CP1-0 to CP1-3 via the memory channel MCH1.

The controller 103 is provided between the host interface 101 and the two memory interfaces 102. The controller 103 controls transmission and reception of signals between the host interface 101 and the two memory interfaces 102.

The controller 103 includes a command decoder 111 and a feature register group 112.

The command decoder 111 analyzes a signal such as a command received from the host HA via the host channel HCH. The command decoder 111 can transfer a signal to the memory chip CP according to the analysis result. If the command is an operation instruction to the interface chip IFC, the command decoder 111 can operate according to the command.

The feature register group 112 is a group of registers for functional setting of the interface chip IFC. In the feature register group 112, parameter data for one or more functions included in the interface chip IFC is stored.

Each of the memory chips CP includes a memory interface 201, an access circuit 202, a feature register group 203, and a memory cell array 204.

The memory interface 201 is a PHY circuit that transmits and receives electrical signals to and from the interface chip IFC via the memory channel MCH.

The memory cell array 204 includes memory cell transistors. Each memory cell transistor is correlated with rows and columns. The memory cell array 204 stores data instructed by a write command from the memory controller MC via the interface chip IFC.

The feature register group 203 is a register for functional setting of the memory chip CP. In the feature register group 203, parameter data for one or more functions included in the memory chip CP is stored.

The access circuit 202 includes, for example, a signal processing circuit, a row decoder, a column decoder, a sense amplifier, a latch circuit, and a voltage generation circuit. The access circuit 202 accesses the memory cell array 204 or stores parameter data in the feature register group 203 in response to a command received from the memory controller MC via the interface chip IFC.

Note that the feature register group 203 is an example of a first register group. The feature register group 112 is an example of a second register group.

The memory controller MC uses a common setting command to store parameter data in the feature register group 112 included in the interface chip IFC and store parameter data in the feature register group 203 included in each of the memory chips CP. This setting command is referred to as a SetFeature command.

The size of an address space (to be referred to as a feature register space) that can be designated as a parameter data storage destination by the SetFeature command is defined by a standard. For example, for a semiconductor memory device having a NAND-type flash memory, a feature register space constituted by 256 addresses is defined by the Joint Electron Device Engineering Councils (JEDEC). Each memory vendor can assign necessary functions to the feature register space.

The semiconductor memory device 1 includes feature register groups 112 and 203. Therefore, the finite feature register space needs to be shared by the feature register groups 112 and 203.

As an example of the technique of sharing the feature register space, a technique to be compared with the embodiment will be described. A technique to be compared with the embodiment is referred to as a comparative example. According to the comparative example, a part of the feature register space is mapped to the feature register group of each of the memory chips, and the other part is mapped to the feature register group of the interface chip. In other words, the feature register space is simply divided into a subspace for each of the memory chips and a subspace for the interface chip.

In recent years, there has been an increasing demand for high-speed interface chips. Thus, the interface chip needs to prepare a large number of registers capable of setting various functions related to communication, such as a training function and an equalizer function. In other words, the amount of parameter data set for the interface chip (and the memory chip) tends to increase.

On the other hand, according to the comparative example, the feature register space is simply divided into a subspace for each of the memory chips and a subspace for the interface chip. Therefore, it is difficult to allocate a large space to the subspace for the interface chip, and there is a concern that the subspace for the interface chip may be insufficient with respect to the amount of increasing parameter data.

In the first embodiment, the feature register group 112 includes multiple pages to which common subspaces are mapped. Then, when the address included in the command sequence of the SetFeature command is a specific value, the interface chip IFC interprets the command sequence of the SetFeature command as a command for page designation. With this configuration, the subspace for the interface chip IFC is expanded without reducing the subspace for each of the memory chips CP.

In the example illustrated in FIG. 3, the feature register group 203 of each of the memory chips CP includes 240 storage areas to which different addresses in the range of 00*h* to EFh are given. In other words, the feature register space in the range of 00*h* to EFh is mapped to the feature register group 203. Each of the 240 storage areas has a storage capacity of 32 bits.

The feature register group 112 included in the interface chip IFC includes a plurality of sets of 16 storage areas to which different addresses in the range of F0h to FFh are given. Each of the sets constituted by 16 storage areas is considered a different page. In other words, a feature register space in the range of F0h to FFh is mapped to each of the pages included in the feature register group 112. Each of the pages is correlated with a unique value as an identification number. A value correlated with each of the pages is referred to as a page number. Each of the 16 storage areas included in each of the pages has a storage capacity of 32 bits.

Each of the addresses (addresses 00*h* to EFh in the example illustrated in FIG. 1) that are given to the feature register group 203 of the memory chip CP is referred to as a memory feature address. Each of the addresses (addresses F0h to FFh in the example illustrated in FIG. 1) that are given to the feature register group 112 of the interface chip IFC is referred to as an interface feature address. An address included in the feature register space may be referred to as a feature address.

The command decoder 111 is configured to interpret the address F0h of the interface feature addresses as a command for page designation (referred to as a page designation identifier).

The SetFeature command is included in a command sequence of a predetermined format and transferred. The command sequence for transfer of the SetFeature command includes an address field and a data field, and the page designation identifier is transferred using the address field.

Figure 4:
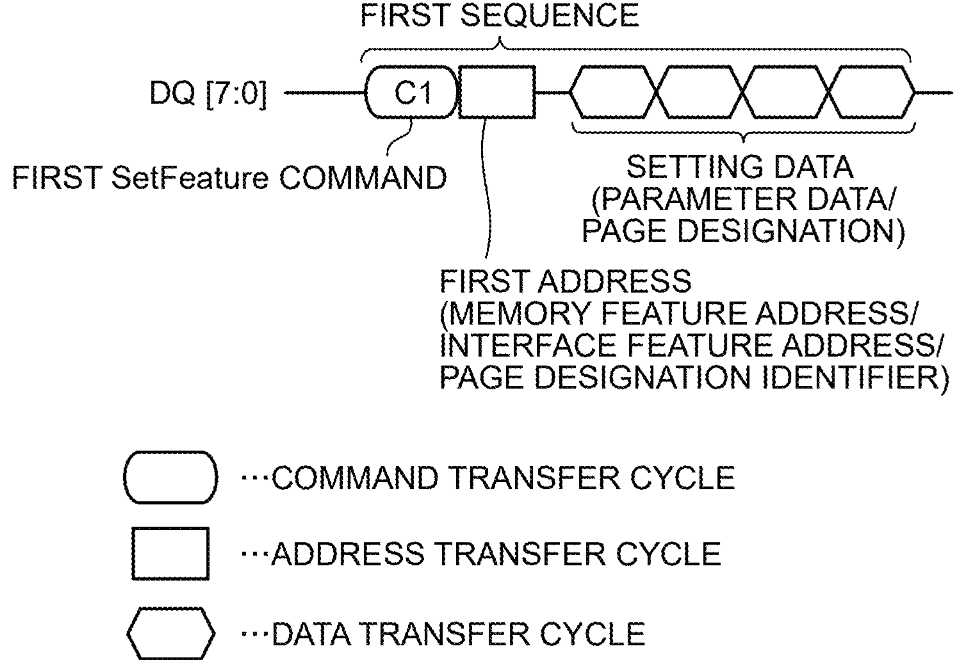
FIG. 4 is a diagram illustrating a configuration of a command sequence for transferring a SetFeature command according to the first embodiment.

FIG. 4 is a diagram illustrating a configuration of a command sequence for transferring the SetFeature command according to the first embodiment.

Note that the SetFeature command includes a first SetFeature command and a second SetFeature command. The first SetFeature command is a SetFeature command for setting parameter data in common to the memory chips CP. The second SetFeature command is a SetFeature command for designating one memory chip CP using a LUN and setting parameter data to the designated memory chip CP. FIG. 4 illustrates a configuration of a command sequence for transferring the first SetFeature command. The command sequence for transferring the first SetFeature command is hereinafter referred to as a first sequence.

The first sequence is configured such that a first SetFeature command C1, a first address, and setting data are transferred in this order. The first SetFeature command C1, the first address, and the setting data are transferred through a signal line group for transferring the data signal DQ(7:0). The first SetFeature command C1 is transferred in one cycle of command transfer. The first address is transferred in one cycle of address transfer. The setting data is transferred in four cycles of data transfer. The command transfer cycle is a cycle in which the data signal DQ(7:0) is transferred as a command using the command latch enable signal CLE. The address transfer cycle is a cycle in which the data signal DQ(7:0) is transferred as an address using the address latch enable signal ALE. The data transfer cycle is a cycle in which the data signal DQ(7:0) is transferred as data.

The data signal DQ(7:0) is transferred with an 8-bit width. Since the first address is transferred in one cycle of address transfer, addresses in the range from 00h to FFh, namely, addresses in the range of the feature register space, can be transferred as the first address.

The setting data is transferred in four cycles of data transfer. Therefore, in one first sequence, 32-bit (=8-bit×4) setting data can be transferred.

In the first embodiment, the first sequence is configured such that any of an address corresponding to a memory feature address, an address corresponding to an interface feature address, and an address corresponding to a page designation identifier can be transferred as the first address.

Further, the first sequence is configured such that not only the parameter data but also information for designating a page (hereinafter, page designation) can be transferred as the setting data. In the case of transferring the page designation as the setting data, the memory controller MC can designate any one of the multiple pages included in the feature register group 112 by transferring the page number as the setting data.

Figure 5:
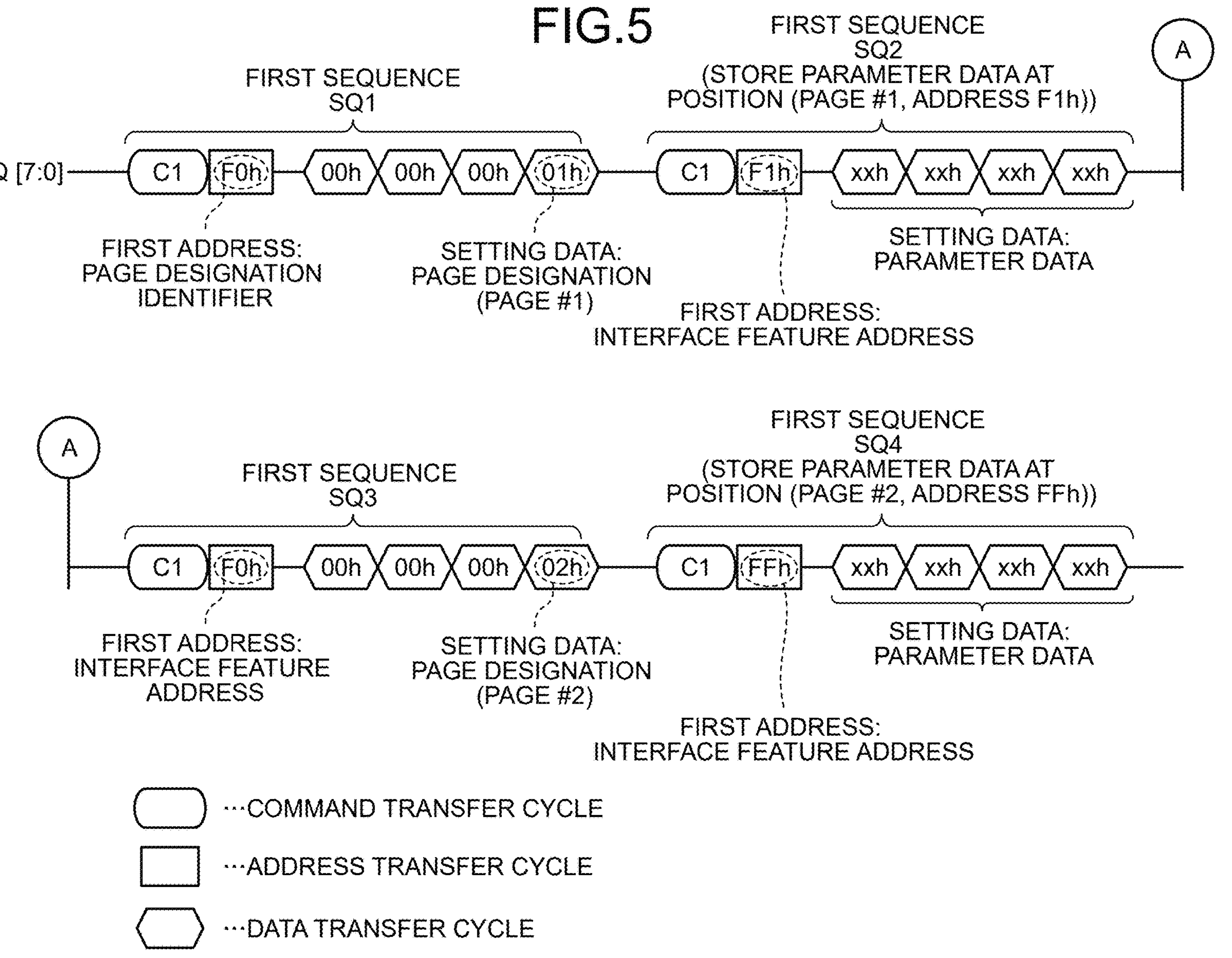
FIG. 5 is a diagram for describing a method of setting parameter data according to the first embodiment using a first sequence.

FIG. 5 is a diagram for describing a method of setting parameter data according to the first embodiment using the first sequence.

In the example illustrated in FIG. 5, the memory controller MC transfers a first sequence SQ1, a first sequence SQ2, a first sequence SQ3, and a first sequence SQ4 to the semiconductor memory device 1 in this order.

The first sequence SQ1 includes an address F0h that is a page designation identifier as a first address, and a value 01h being a page designation for designating the page #1 as setting data. When the interface chip IFC receives the first sequence SQ1, the command decoder 111 recognizes that the first sequence SQ1 is a command sequence for page designation because the page designation identifier is included in the first sequence SQ1. The command decoder 111 recognizes that the page #1 is designated because the value 01h is included in the first sequence SQ1 as the setting data.

The first sequence SQ2 includes an address F1h corresponding to an interface feature address as a first address and includes parameter data as setting data. When the interface chip IFC receives the first sequence SQ2 following the first sequence SQ1, the command decoder 111 stores the parameter data included in the first sequence SQ2 at the position indicated by the address F1h of the page #1 that is the already designated page in the feature register group 112.

The first sequence SQ3 includes an address F0h that is a page designation identifier as a first address, and a value 02h that is a page designation for designating the page #2 as setting data. When the interface chip IFC receives the first sequence SQ3, the command decoder 111 recognizes that the first sequence SQ3 is a command sequence for page designation because the page designation identifier is included in the first sequence SQ3. The command decoder 111 recognizes that the page #2 is designated because the value 02h is included in the first sequence SQ3 as setting data.

The first sequence SQ4 includes an address FFh corresponding to an interface feature address as a first address and includes parameter data as setting data. When the interface chip IFC receives the first sequence SQ4 following the first sequence SQ3, the command decoder 111 stores the parameter data included in the first sequence SQ4 at the position indicated by the address FFh of the page #2 in the feature register group 112.

As described above, the feature register group 112 of the interface chip IFC has multiple pages, each page being assigned a total of 16 addresses of the addresses F0h to FFh. The first sequence is configured such that the storage destination page of the parameter data can be switched from among the multiple pages. Therefore, the address space that can be used for setting the parameter data for the interface chip IFC is expanded according to the number of pages included in the feature register group 112. Thus, the capacity of the feature register group 112 of the interface chip IFC capable of storing the parameter data can be increased. In other words, the amount of parameter data that can be stored in the feature register group 112 can be increased as compared with the comparative example.

Figure 6:
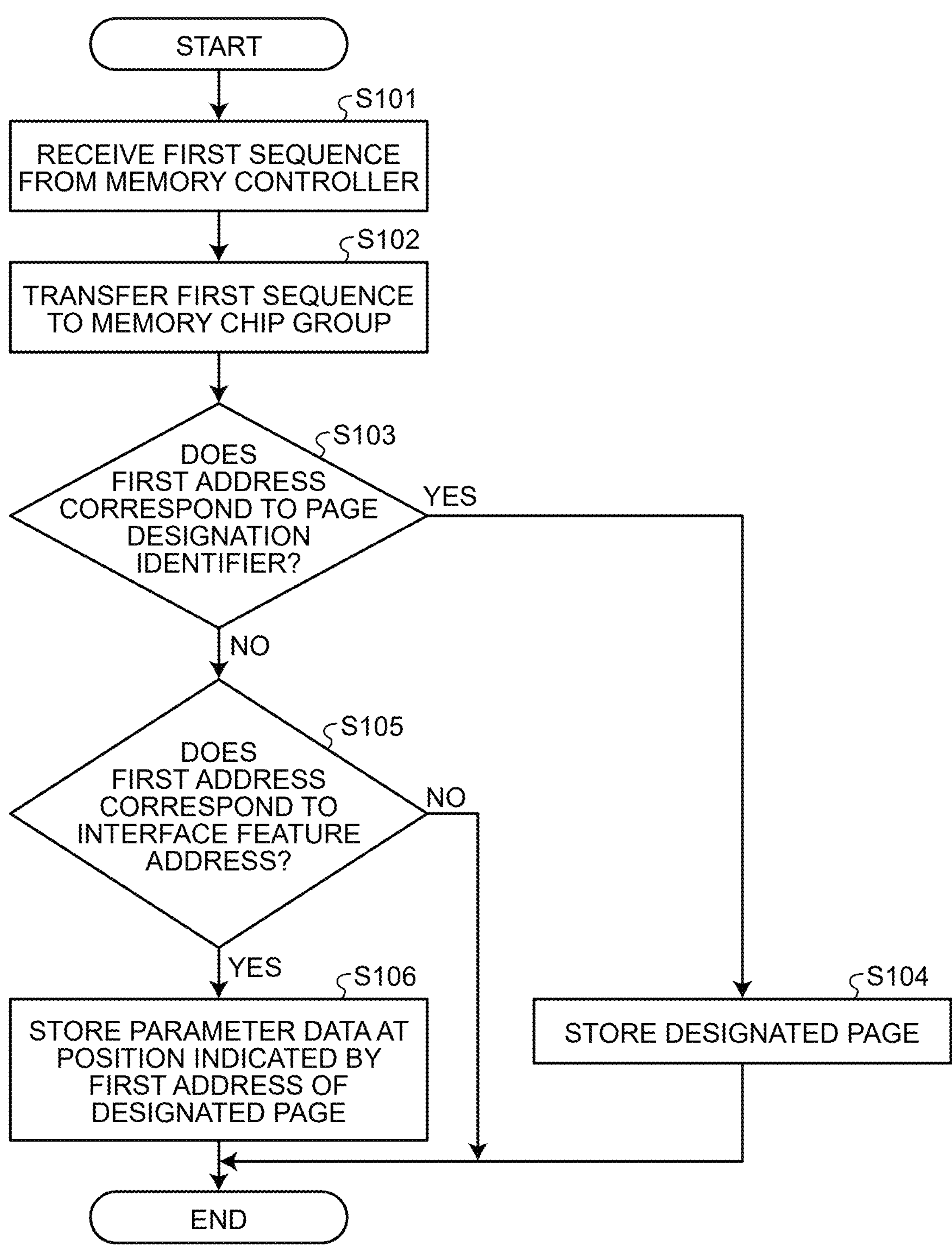
FIG. 6 is a flowchart illustrating an example of an operation of the interface chip according to the first embodiment.

FIG. 6 is a flowchart illustrating an example of the operation of the interface chip IFC according to the first embodiment.

When the interface chip IFC receives the first sequence from the memory controller MC via the terminal group T (S101), the controller 103 transfers the received first sequence to a memory chip CP group (S102).

The command decoder 111 determines whether or not the first address included in the received first sequence corresponds to the page designation identifier (S103). According to the example illustrated in FIGS. 3 and 5, the address F0h corresponds to the page designation identifier.

In a case where the first address corresponds to the page designation identifier (S103: Yes), the command decoder 111 identifies the designated page based on the setting data included in the first sequence. Then, the command decoder 111 stores the designated page (S104).

In a case where the first address does not correspond to the page designation identifier (S103: No), the command decoder 111 determines whether or not the first address corresponds to the interface feature address (S105).

According to the example illustrated in FIGS. 3 and 5, the addresses F0h to FFh correspond to the interface feature addresses. Note that the address F0h is used as a page designation identifier. Therefore, in S105, the command decoder 111 determines that the first address corresponds to the interface feature address when the first address is any of the addresses F1h to FFh.

In a case where the first address corresponds to the interface feature address (S105: Yes), the command decoder 111 stores the parameter data included as setting data in the first sequence at the position indicated by the first address of the designated page in the feature register group 112 (S106).

In a case where the first address does not correspond to the interface feature address (S105: No), or after S104, or after S106, the interface chip IFC ends the operation.

The interface chip IFC executes the operations of S102 to S106 every time the first sequence is received. Thereby, the operation illustrated in FIG. 5 is implemented.

Figure 7:
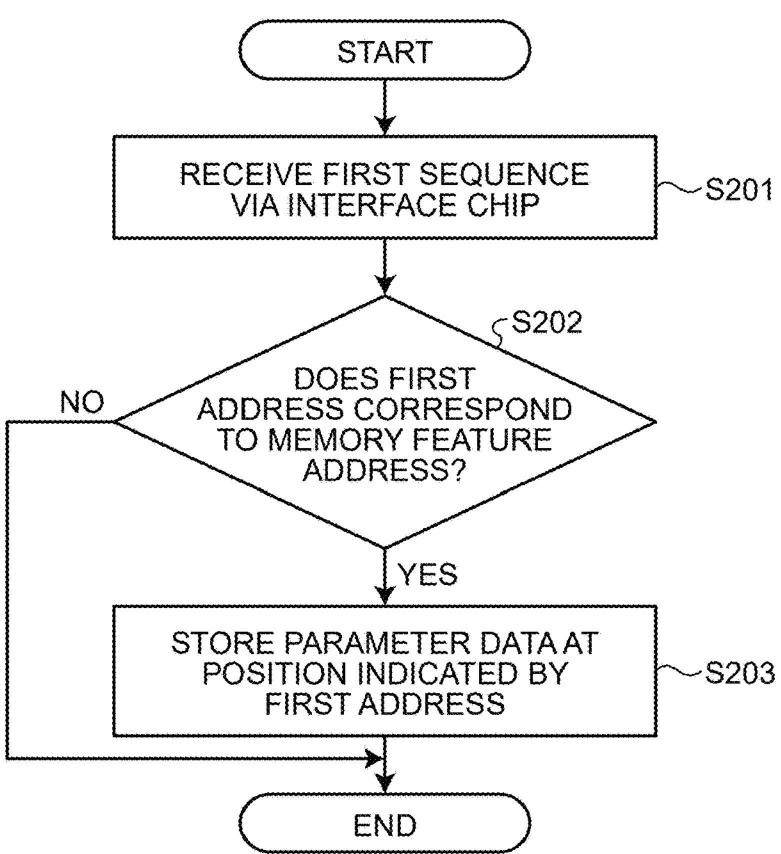
FIG. 7 is a flowchart illustrating an example of an operation of the memory chip according to the first embodiment.

FIG. 7 is a flowchart illustrating an example of the operation of the memory chip CP according to the first embodiment. Note that all the memory chips CP included in the semiconductor memory device 1 execute a common operation. Here, the operation of one memory chip CP will be described as a representative of all the memory chips CP.

When the memory chips CP receive the first sequence via the interface chip IFC (S201), the access circuit 202 determines whether or not the first address included in the received first sequence corresponds to a memory feature address (S202).

According to the example illustrated in FIGS. 3 and 5, the addresses 00h to EFh correspond to memory feature addresses. Therefore, in S202, the access circuit 202 determines that the first address corresponds to the memory feature address when the first address is any of the addresses 00h to EFh.

In a case where the first address corresponds to the memory feature address (S202: Yes), the access circuit 202 stores the parameter data included as setting data in the first sequence at the position indicated by the first address in the feature register group 203 (S203).

In a case where the first address does not correspond to the memory feature address (S202: No) or after S203, the memory chip CP ends the operation.

Note that an example in which the first sequence is used as the command sequence for transferring the SetFeature command has been described above. Even when the semiconductor memory device 1 receives a command sequence (referred to as a second sequence) for transferring the second SetFeature command, the semiconductor memory device may execute the same operation (for example, the operation illustrated in FIGS. 5 and 6) as when the first sequence is received.

Figure 8:
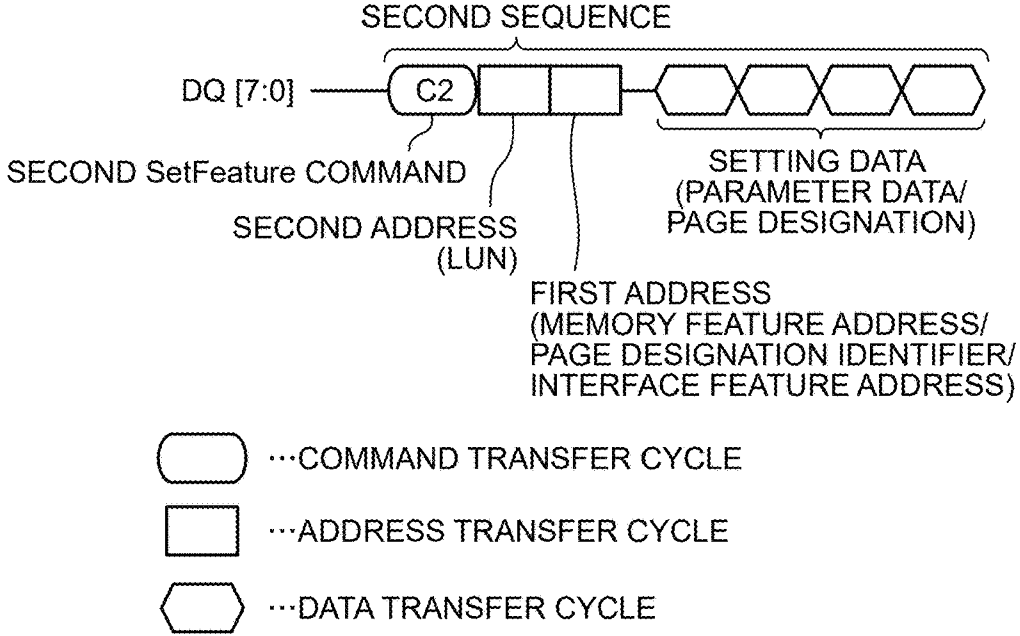
FIG. 8 is a diagram illustrating a configuration of a second sequence that is another command sequence for transferring the SetFeature command according to the first embodiment.

FIG. 8 is a diagram illustrating the configuration of the second sequence that is another command sequence for transferring the SetFeature command according to the first embodiment.

The second sequence is configured such that a second SetFeature command C2, a second address, a first address, and setting data are transferred in this order. The second SetFeature command C2 is transferred in one cycle of command transfer. Each of the first address and the second address is transferred in one cycle of address transfer. The setting data is transferred in four cycles of data transfer.

The second address is an address to which a LUN can be designated.

In the interface chip IFC, the command decoder 111 executes the series of operations illustrated in FIG. 6 based on the first address and the setting data regardless of the second address.

The access circuit 202 of each of the memory chips CP executes the series of operations illustrated in FIG. 7 when the second address corresponds to the LUN that is given to the memory chip CP including the second address.

As described above, according to the first embodiment, the command sequence of the SetFeature command including the first address is input to the terminal group T. The memory chip CP includes a feature register group 203 to which a subspace (for example, a space in the range of 00h to EFh) of the feature register space is mapped, and a memory cell array 204. The memory chip CP stores parameter data in the feature register group 203 when the first address is included in the subspace mapped to the feature register group 203. On the other hand, when the first address is not included in the subspace mapped to the feature register group 203, the memory chip CP stores no parameter data (namely, does not store parameter data) in the feature register group 203. The interface chip IFC includes a feature register group 112. The feature register group 112 includes multiple pages to which common subspaces (for example, spaces in the range of F0h to FFh) exclusive of the subspace mapped to the feature register group 203 is mapped. When the first address included in the received command sequence corresponds to the page designation identifier, the interface chip IFC identifies the storage destination page of the parameter data based on the setting data included in the command sequence.

Therefore, the subspace that can be used for setting parameter data for the interface chip IFC is expanded according to the number of pages included in the feature register group 112. The capacity of the feature register group 112 of the interface chip IFC capable of storing parameter data can be increased. The amount of parameter data that can be stored in the feature register group 112 can be increased as compared with the comparative example. In other words, it is possible to suitably store parameter data in the feature register group 112 included in the interface chip IFC.

Moreover, according to the first embodiment, when the interface chip IFC receives a command sequence including the value corresponding to the page designation identifier as the first address, the interface chip identifies one page from among the multiple pages included in the feature register group 112, based on the setting data included in the command sequence. Then, when the interface chip IFC receives a command sequence including, as the first address, an interface feature address that does not correspond to the page designation identifier, the interface chip stores the parameter data included in the command sequence as the setting data in the identifies one page from among the multiple pages included in the feature register group 112.

Therefore, the amount of parameter data that can be stored in the feature register group 112 can be increased as compared with the comparative example. In other words, it is possible to suitably store parameter data in the feature register group 112 included in the interface chip IFC.

Second Embodiment

In the second embodiment, contents different from the first embodiment will be described. The same contents as in the first embodiment will not be described or will be described in a simplified manner.

FIG. 9 is a diagram for describing an example of the configuration of the interface chip IFC and each of the memory chips CP according to the second embodiment.

In the second embodiment, the controller 103 of the interface chip IFC includes a command decoder 111*a* instead of the command decoder 111. The command decoder 111*a* is configured to be able to designate a page based on the second sequence.

Each of the memory chips CP includes an access circuit 202*a* instead of the access circuit 202.

Figure 10:
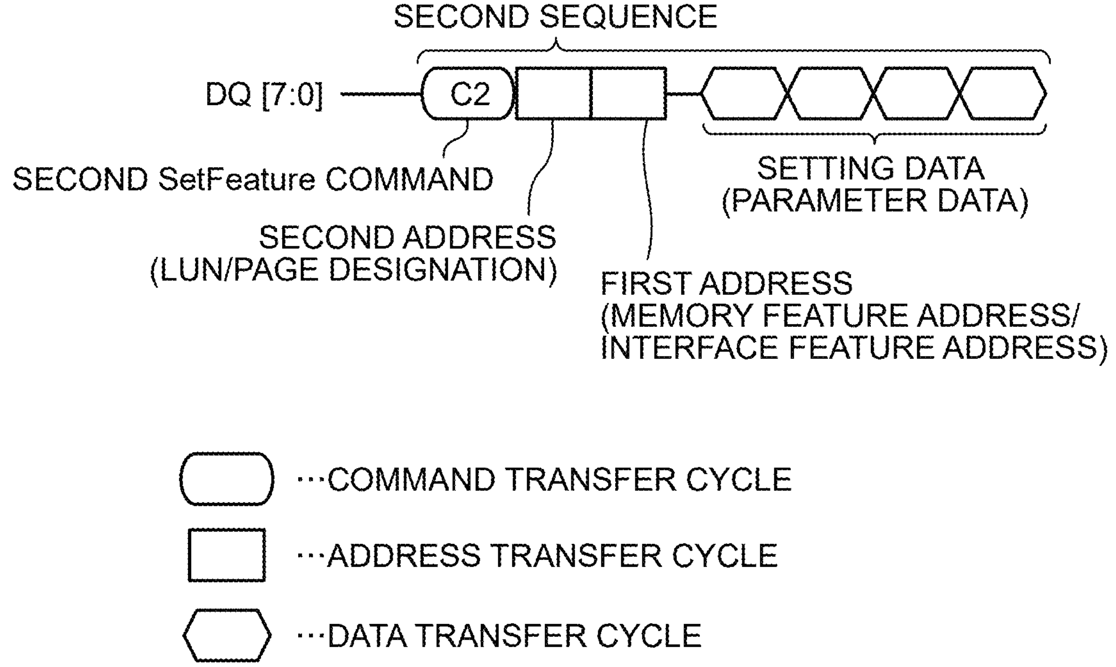
FIG. 10 is a diagram illustrating a configuration of a second sequence according to the second embodiment.

FIG. 10 is a diagram illustrating the configuration of the second sequence according to the second embodiment.

The second sequence is configured such that the second SetFeature command C2, the second address, the first address, and the setting data are transferred in this order.

The second sequence is configured such that both an address corresponding to the memory feature address and an address corresponding to the interface feature address can be transferred as the first address. In other words, as the first address, an address included in any of a subspace (here, a space in the range of 00h to EFh) mapped to the feature register group 203 and a subspace (for example, a space in the range of F0h to FFh) mapped to the feature register group 112 in the feature register space is transferred.

The second sequence is configured such that both the LUN and the page designation can be transferred as the second address. More specifically, when the first address is included in the interface feature address, namely, the subspace mapped to the feature register group 112, the command decoder 111*a* interprets the second address as a page designation.

According to the example illustrated in FIGS. 2 and 9, the semiconductor memory device 1 includes eight memory chips CP to which LUN0 to LUN7 are given. Therefore, the memory controller MC can designate one LUN from among the eight memory chips CP by transferring a value in the range of 00h to 07h as the second address.

When the memory controller MC transfers the page designation as the second address, the memory controller can designate an optional page by transferring the page number as the second address.

The second sequence is configured such that parameter data can be transferred as setting data.

Figure 11:
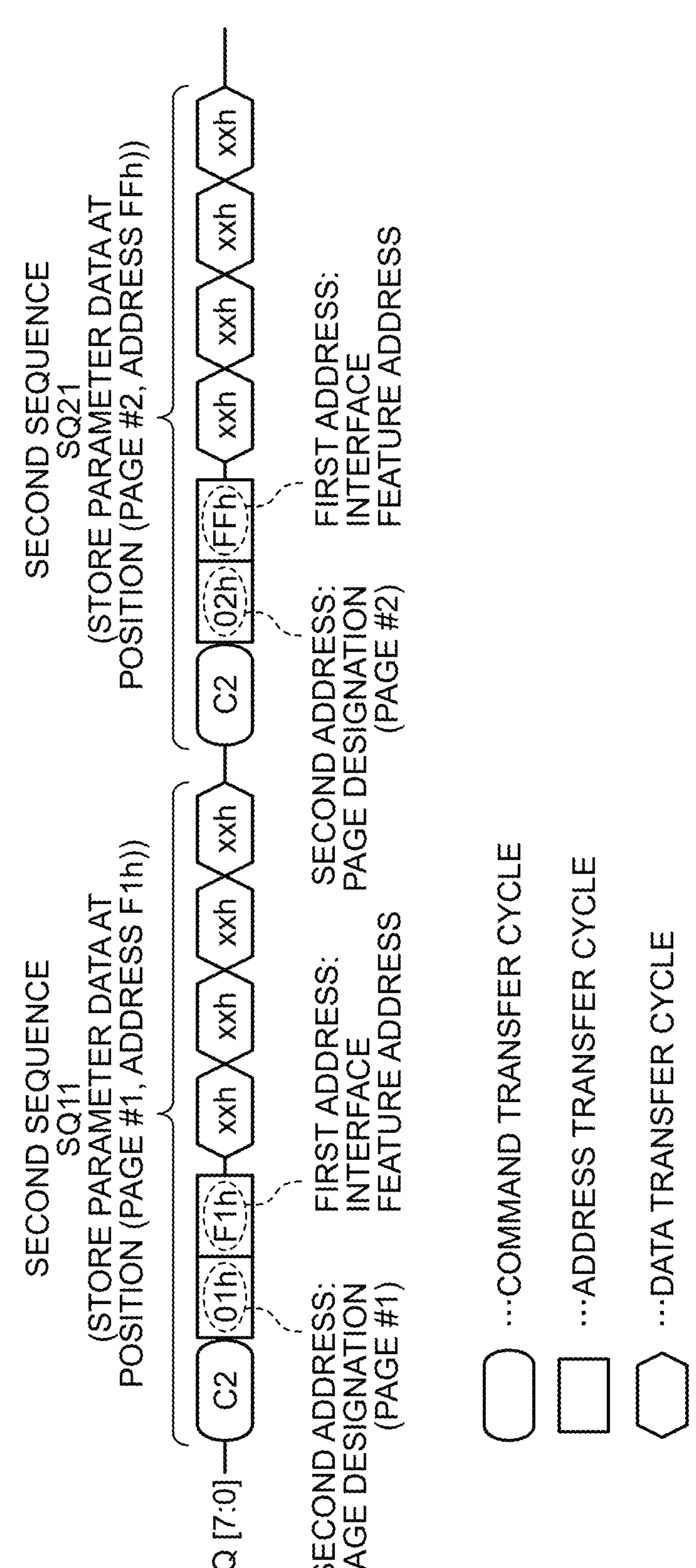
FIG. 11 is a diagram for describing a method of setting parameter data according to the second embodiment using the second sequence.

FIG. 11 is a diagram for describing a method of setting parameter data according to the second embodiment using the second sequence.

In the example illustrated in FIG. 11, the memory controller MC transfers a second sequence SQ11 and a second sequence SQ21 to the semiconductor memory device 1 in this order.

The second sequence SQ11 includes an address F1h corresponding to an interface feature address, and includes a value 01h as a second address. When the interface chip IFC receives the second sequence SQ11, the command decoder 111*a* recognizes that the second sequence SQ11 is a command sequence of the SetFeature command targeting the interface chip IFC because the first address corresponds to the interface feature address. For the second sequence targeted by the interface chip IFC, the command decoder 111*a* interprets the second address as a page designation. In the example illustrated in FIG. 11, the command decoder 111*a* recognizes that the page #1 is designated because the second sequence SQ11 includes the value 01h as the second address. Therefore, the command decoder 111*a* stores the parameter included as setting data in the second sequence SQ11 at the position indicated by the address F1h of the page #1 in the feature register group 112.

The second sequence SQ21 includes an address FFh corresponding to the interface feature address and includes a value 02h as the second address. Since the first address corresponds to the interface feature address, the command decoder 111*a* recognizes that the second sequence SQ21 is a command sequence of the SetFeature command targeting the interface chip IFC, and interprets the second address as a page designation. In the example illustrated in FIG. 11, the command decoder 111*a* recognizes that the page #2 is designated because the second sequence SQ21 includes the value 02h as the second address. Therefore, the command decoder 111*a* stores the parameter data included as setting data in the second sequence SQ21 at the position indicated by the address FFh of the page #2 in the feature register group 112.

Figure 12:
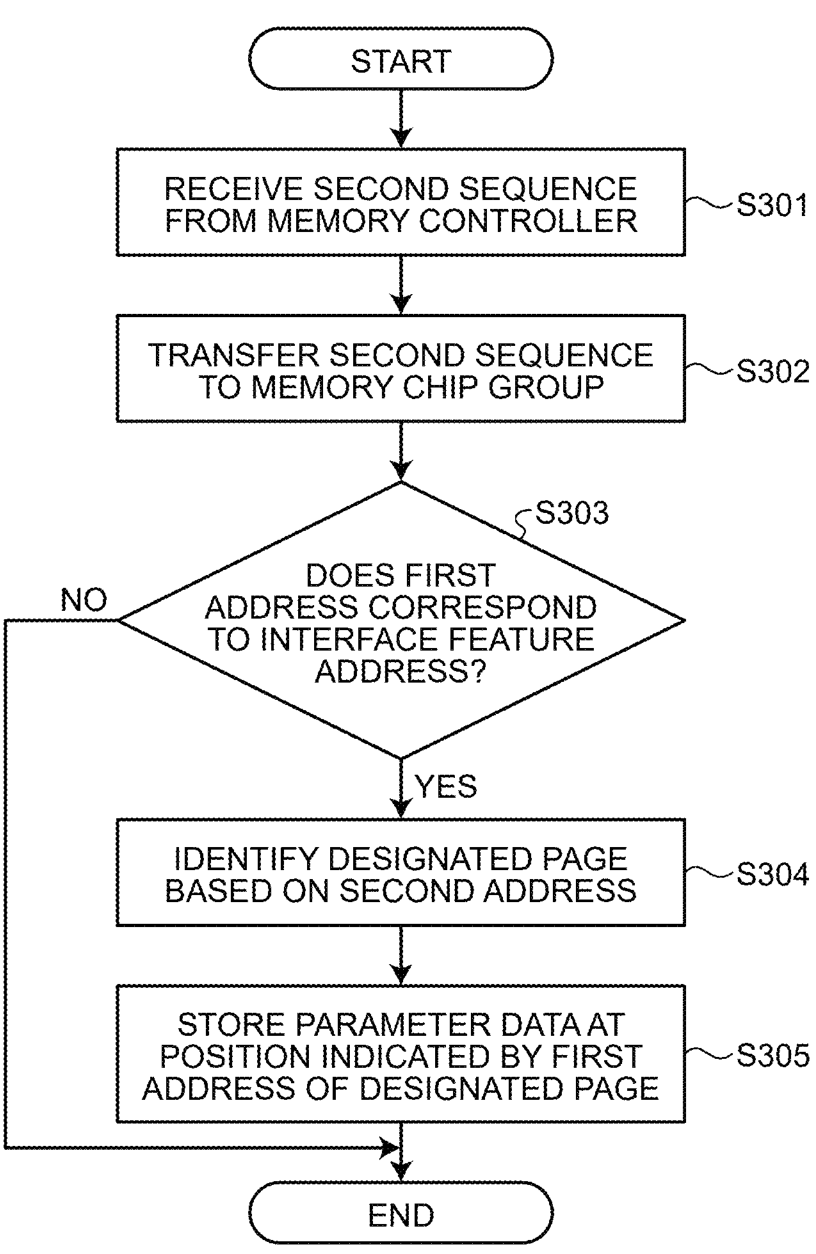
FIG. 12 is a flowchart illustrating an example of the operation of the interface chip according to the second embodiment.

FIG. 12 is a flowchart illustrating an example of the operation of the interface chip IFC according to the second embodiment.

When the interface chip IFC receives the second sequence from the memory controller MC (S301), the controller 103 transfers the received second sequence to the memory chip CP group (S302).

The command decoder 111*a* determines whether or not the first address included in the received second sequence corresponds to an interface feature address (S303).

Note that, according to the example illustrated in FIGS. 9 and 11, the addresses F0h to FFh correspond to the interface feature addresses.

In a case where the first address corresponds to the interface feature address (S303: Yes), the command decoder 111*a* identifies the designated page based on the value included as the second address in the second sequence (S304). The command decoder 111*a* then stores the parameter data included as setting data in the second sequence at the position indicated by the first address of the designated page in the feature register group 112 (S305).

In a case where the first address does not correspond to the interface feature address (S303: No), or after S305, the interface chip IFC ends the operation.

The interface chip IFC executes the operations of S302 to S305 every time the second sequence is received. Thereby, the operation illustrated in FIG. 11 is implemented.

Figure 13:
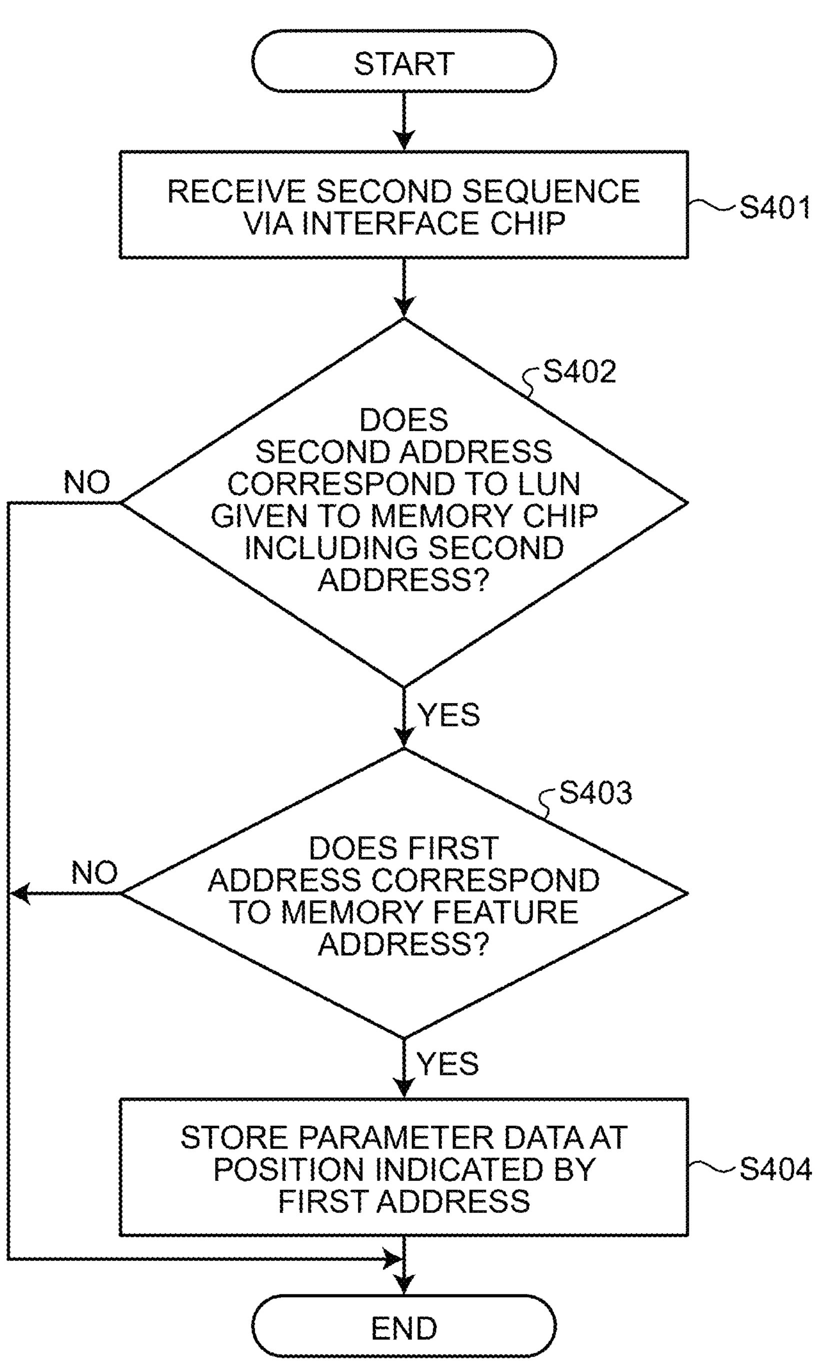
FIG. 13 is a flowchart illustrating an example of the operation of the memory chip according to the second embodiment.

FIG. 13 is a flowchart illustrating an example of the operation of the memory chip CP according to the second embodiment. As in the first embodiment, all the memory chips CP included in the semiconductor memory device 1 execute a common operation. Here, the operation of one memory chip CP will be described as a representative of all the memory chips CP.

When the memory chips CP receive the second sequence via the interface chip IFC (S401), the access circuit 202 determines whether or not the second address included in the received second sequence corresponds to the LUN given to the memory chip CP including the second address (S402).

In a case where the second address corresponds to the LUN given to the memory chip CP including the second address (S402: Yes), the access circuit 202 determines whether or not the second address included in the received second sequence corresponds to the memory feature address (S403).

According to the example illustrated in FIGS. 9 and 11, the addresses 00h to EFh correspond to the memory feature addresses. Therefore, in S403, the access circuit 202 determines that the first address corresponds to the memory feature address when the first address is any of the addresses 00h to EFh.

In a case where the first address corresponds to the memory feature address (S403: Yes), the access circuit 202 stores the parameter data included as setting data in the first sequence at the position indicated by the first address in the feature register group 203 (S404).

In a case where the second address does not correspond to the LUN given to the memory chip CP including the access circuit 202 of the second address (S402: No), or if the first address does not correspond to the memory feature address (S403: No), or after S404, the memory chip CP ends the operation.

As described above, according to the second embodiment, the second sequence is configured such that the LUN or the page number can be transferred as the second address. When the first address is included in the subspace mapped to the feature register group 112, the interface chip IFC interprets the second address as a page designation, namely, a page number. The interface chip IFC then stores parameter data at the position indicated by a first address of one page corresponding to a page number among multiple pages included in the feature register group 112.

Since the page can be designated by using the second address of the second sequence, the memory controller MC can instruct both the designation of the page and the storage of parameter data by one second sequence.

Third Embodiment

In the third embodiment, contents different from the second embodiment will be described. The same contents as in the second embodiment will not be described or will be described in a simplified manner.

In the third embodiment, as in the second embodiment, the memory controller MC can store parameter data in the feature register group included in the interface chip IFC by using the second sequence. The method of page designation is, however, different from that of the second embodiment.

The second address is transferred in one cycle of address transfer with an 8-bit width, so that 256 types of values can be transferred as the second address. However, when the number of memory chips CP provided in the semiconductor memory device 1 is less than 256, the 256 types of values are not required to designate a LUN. For example, according to the example illustrated in FIG. 1, the number of memory chips CP provided in the semiconductor memory device 1 is eight, so that 8 types of values are sufficient to designate a LUN.

In the third embodiment, from among the 256 types of values that can be transferred as the second address, some types of values that are not used for designating a LUN are used for designating a page.

Figure 14:
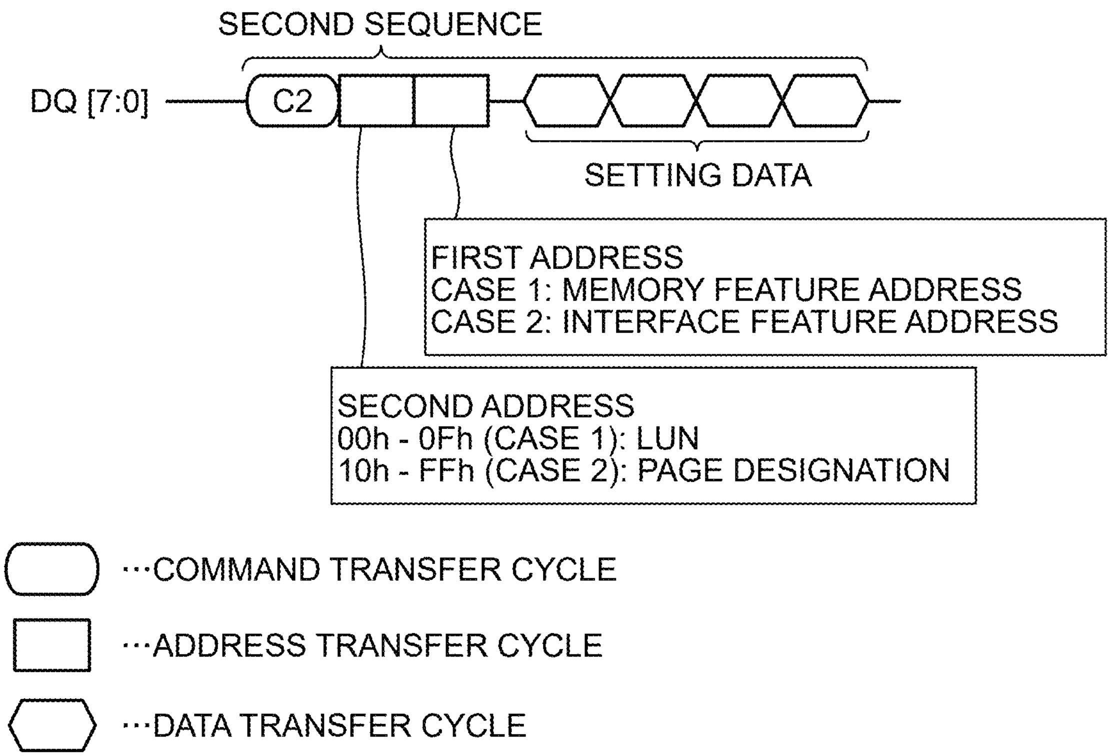
FIG. 14 is a diagram illustrating a configuration of the second sequence according to a third embodiment.

FIG. 14 is a diagram illustrating the configuration of the second sequence according to the third embodiment.

The second sequence is configured such that the second SetFeature command C2, the second address, the first address, and the setting data are transferred in this order.

The second sequence is configured such that both a value for LUN designation and a value for page designation can be transferred as the second address. From among the 256 types of values that can be transferred as the second address, at least values corresponding to the number of memory chips CP provided in the semiconductor memory device 1 are used for the LUN designation, and the remaining values are used for the page designation. According to the example illustrated in FIG. 14, values in the range from 00h to 0Fh are used for the LUN designation, and values in the range from 10*h* to FFh are used for the page designation.

In a case where the second address is any value in the range from 00h to 0Fh (Case 1), the interface chip IFC interprets that the first address corresponds to the memory feature address. In a case where the second address is any value in the range from 10*h* to FFh (Case 2), the interface chip IFC interprets that the first address corresponds to the interface feature address.

FIG. 15 is a diagram for describing an example of the configuration of the interface chip IFC and each of the memory chips CP according to the third embodiment.

In the third embodiment, the controller 103 of the interface chip IFC includes a command decoder 111*b* instead of the command decoder 111*a*. The controller 103 also includes a feature register group 112*b* instead of the feature register group 112. The controller 103 also includes a memory 113.

The feature register group 112*b* includes plural sets of 256 storage areas, each set being given different addresses in the range of 00h to FFh. Each of the sets constituted by 256 storage areas is considered as a different page and is given a unique page number. Each of the 256 storage areas included in each of the sets has a storage capacity of 32 bits.

The memory 113 is a nonvolatile memory in which a conversion table 120 is stored. The memory 113 is, for example, an eFuse or a read only memory (ROM). The conversion table 120 is stored in the memory 113 at the time of manufacturing the semiconductor memory device 1. Note that the type of the memory 113 and the timing of storing the conversion table 120 are not limited thereto.

Each of the memory chips CP includes a feature register group 203*b* instead of the feature register group 203. The feature register group 203*b* includes 256 storage areas to which different addresses in the range of 00h to FFh are given. Each of the 256 storage areas provided in the feature register group 203 has a storage capacity of 32 bits.

Each of the memory chips CP includes an access circuit 202*b* instead of the access circuit 202.

Figures 16, 17:
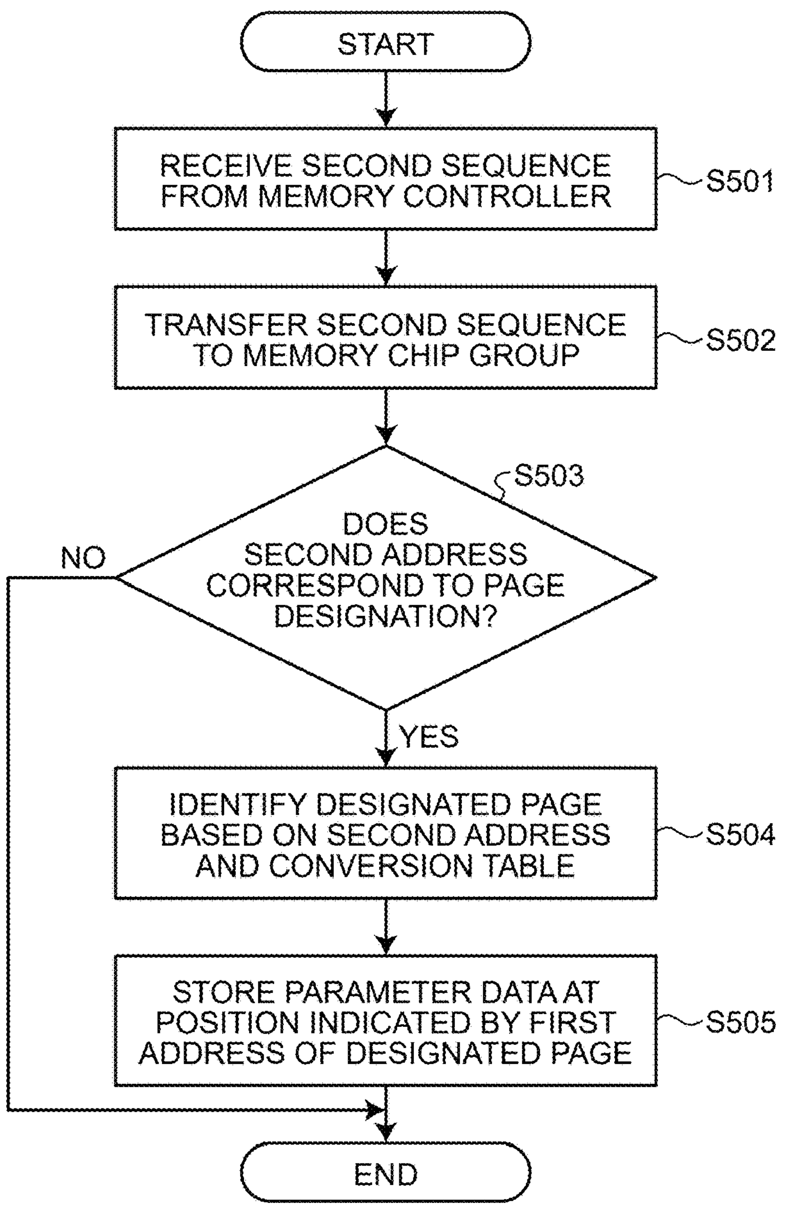
FIG. 16 is a diagram illustrating an example of a configuration of a conversion table according to the third embodiment.
FIG. 17 is a flowchart illustrating an example of the operation of the interface chip according to the third embodiment.

FIG. 16 is a diagram illustrating an example of the configuration of the conversion table 120 according to the third embodiment.

In the conversion table 120, a correspondence between a value for designating a page that can be transferred as the second address and the page number is recorded for each page number. According to the example illustrated in FIG. 14, the value for page designation that can be transferred as the second address is a value in the range from 10*h* to FFh. In the third embodiment, since the LUN can be transferred as the second address, the page number cannot be used as the second address as it is. By correlating a value exclusive of a value that can be used as a LUN with a page number by the conversion table 120, a value in the range that is not used as a LUN can be used as a page designation.

From the example of the conversion table 120 illustrated in FIG. 16, it can be read that the value 10h transferred as the second address corresponds to the page number 1 and the value 11h transferred as the second address corresponds to the page number 2.

By referring to the conversion table 120, the command decoder 111*b* can identify the designated page based on the page designation transferred as the second address.

FIG. 17 is a flowchart illustrating an example of the operation of the interface chip IFC according to the third embodiment.

When the interface chip IFC receives the second sequence from the memory controller MC (S501), the controller 103 transfers the received second sequence to the memory chip CP group (S502).

The command decoder 111*b* determines whether or not the second address included in the received second sequence corresponds to page designation (S503).

According to the example illustrated in FIG. 14, a value in the range of addresses 10h to FFh is used as the page designation. The command decoder 111*b* determines whether or not the second address corresponds to the page designation based on whether or not the second address is a value in the range of the addresses 10h to FFh.

Note that the method of determining whether or not the second address corresponds to the page designation is not limited thereto. For example, the command decoder 111*b* may determine whether or not the second address corresponds to the page designation by referring to the conversion table 120. The value of the page designation is correlated with any page number by the conversion table 120. The command decoder 111*b* may determine whether or not the second address corresponds to the page designation based on whether or not the second address is correlated with any page number by the conversion table 120.

In a case where the second address corresponds to the page designation (S503: Yes), the command decoder 111*b* identifies the designated page based on the second address and the conversion table 120 (S504). Specifically, the command decoder 111*b* identifies the designated page by acquiring the page number correlated with the second address from the conversion table 120.

The command decoder 111*b* stores the parameter data included as setting data in the second sequence at the position indicated by the first address of the designated page in the feature register group 112 (S505).

In a case where the second address does not correspond to the page designation (S503: No), or after S505, the interface chip IFC ends the operation.

Figure 18:
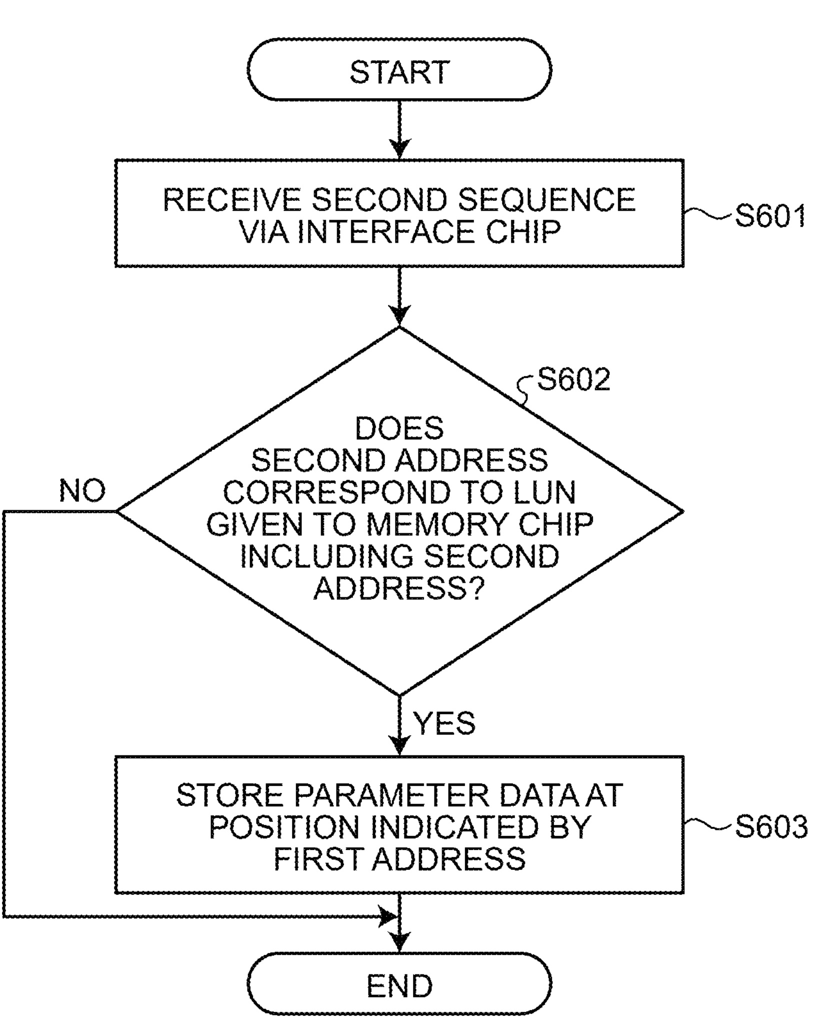
FIG. 18 is a flowchart illustrating an example of the operation of the memory chip according to the third embodiment.

FIG. 18 is a flowchart illustrating an example of the operation of the memory chip CP according to the third embodiment. Also in this figure, the operation of one memory chip CP will be described as a representative of all the memory chips CP.

When the memory chip CP receive the second sequence via the interface chip IFC (S601), the access circuit 202*b* determines whether or not the second address included in the received second sequence corresponds to the LUN given to the memory chip CP including the second address (S602).

In a case where the second address corresponds to the LUN given to the memory chip CP including the second address (S602: Yes), the access circuit 202*b* stores the parameter data included as setting data in the second sequence at the position indicated by the first address in the feature register group 203*b* (S603).

In a case where the second address does not correspond to the LUN given to the memory chip CP including the access circuit 202*b* of the second address (S602: No), or after S603, the memory chip CP ends the operation.

As described above, according to the third embodiment, the second sequence is configured such that a value (in the above example, a value correlated with the page number in the range from 10*h* to FFh) that is correlated with each of the multiple pages included in the feature register group 112*b* exclusive of a value that can be used as the LUN can be transferred as the second address. When the second address is a value correlated with any page, the interface chip IFC stores parameter data at the position indicated by the first address of the page correlated with the second address.

In the first embodiment and the second embodiment, the command sequence of the SetFeature command is configured such that whether the target of the SetFeature command is the interface chip IFC or each of the memory chips CP can be determined based on whether the first address corresponds to the interface feature address or the memory feature address. Therefore, duplication of the values of the interface feature address and the memory feature address is prohibited.

In contrast, according to the third embodiment, the second sequence is configured to be able to determine whether the target is the interface chip IFC or each of the memory chips CP based on the second address. Thus, the values of the interface feature address and the memory feature address are allowed to duplicate. Therefore, common address spaces (spaces in the range of 00h to FFh in the above example) can be mapped to each page of the feature register group 112*b* and the feature register group 203*b*. Thus, the capacity of the feature register group 112*b* of the interface chip IFC capable of storing the parameter data can be increased, and the full-size feature register space of defined by the standard can be mapped to the feature register group 203*b*.

Fourth Embodiment

The memory vendor does not necessarily assign the functions of the memory chip CP to all the 256 addresses included in the feature register space. The 256 addresses included in the feature register space include addresses to which the functions of the memory chip CP are not assigned, namely, addresses that are not used in the memory chip CP.

In a fourth embodiment, addresses, which are not used in the memory chip CP among the 256 addresses included in the feature register space, are used in the interface chip IFC.

The fourth embodiment will be described below. In the fourth embodiment, contents different from the first embodiment will be described. The same contents as in the first embodiment will not be described or will be described in a simplified manner.

FIG. 19 is a diagram for describing an example of the configuration of the interface chip IFC and each of the memory chips CP according to the fourth embodiment.

The controller 103 of the interface chip IFC includes a command decoder 111*c* instead of the command decoder 111. The controller 103 also includes a feature register group 112*c* instead of the feature register group 112.

The feature register group 112*c* includes 32 storage areas to which different addresses in the range of 00h to 1Fh are given. Each of the 32 storage areas has a storage capacity of 32 bits. In the fourth embodiment, 32 addresses in the range of 00h to 1Fh given to the feature register group 112*c* are referred to as interface feature addresses.

The controller 103 further includes a memory 113*c*. The memory 113*c* is a nonvolatile memory in which the conversion table 120*c* is stored. The memory 113*c* is, for example, an eFuse or a read only memory (ROM). The conversion table 120*c* is stored in the memory 113*c* at the time of manufacturing the semiconductor memory device 1. Note that the type of the memory 113*c* and the timing of storing the conversion table 120 are not limited thereto.

Each of the memory chips CP includes an access circuit 202*c* instead of the access circuit 202. Each of the memory chips CP also includes a feature register group 203*c* instead of the feature register group 203.

The feature register group 203*c* includes 256 storage areas to which different addresses in the range of 00h to FFh are given. Each of the 256 storage areas provided in the feature register group 203*c* has a storage capacity of 32 bits. Note that, in the feature register group 203*c*, no function is assigned to 32 addresses out of the addresses in the range of 00h to FFh. In other words, 32 addresses in the feature register space are not used in the memory chip CP.

The 32 addresses that are not used in the memory chip CP in the feature register space are correlated with 32 storage areas included in the feature register group 112*c* of the interface chip IFC. The conversion table 120*c* is a table in which a correspondence between 32 addresses not used in the memory chip CP and 32 storage areas included in the feature register group 112*c* is recorded.

FIG. 20 is a diagram illustrating an example of the configuration of the conversion table 120*c* according to the fourth embodiment.

In the conversion table 120*c*, a correspondence between an address that is not used in the memory chip CP among 256 addresses that can be transferred as the first address and an interface feature address is recorded.

In the example illustrated in FIG. 20, it can be read from the conversion table 120*c* that the value 80*h* transferred as the first address corresponds to the interface feature address 00h, the value A2h transferred as the first address corresponds to the interface feature address 01h, and the like.

From such a configuration, the following can be considered. Specifically, the feature register space (an example of a first access space) includes a space (an example of a first space) used for access to the feature register group 203*c* and a space (an example of a second space) used for access to the feature register group 112*c*. The space used for access to the feature register group 203*c* and the space used for access to the feature register group 112*c* are mutually exclusive. In the conversion table 120*c*, a correspondence between an address group included in a space used for access to the feature register group 112*c* and the feature register group 112*c* is recorded.

Figure 21:
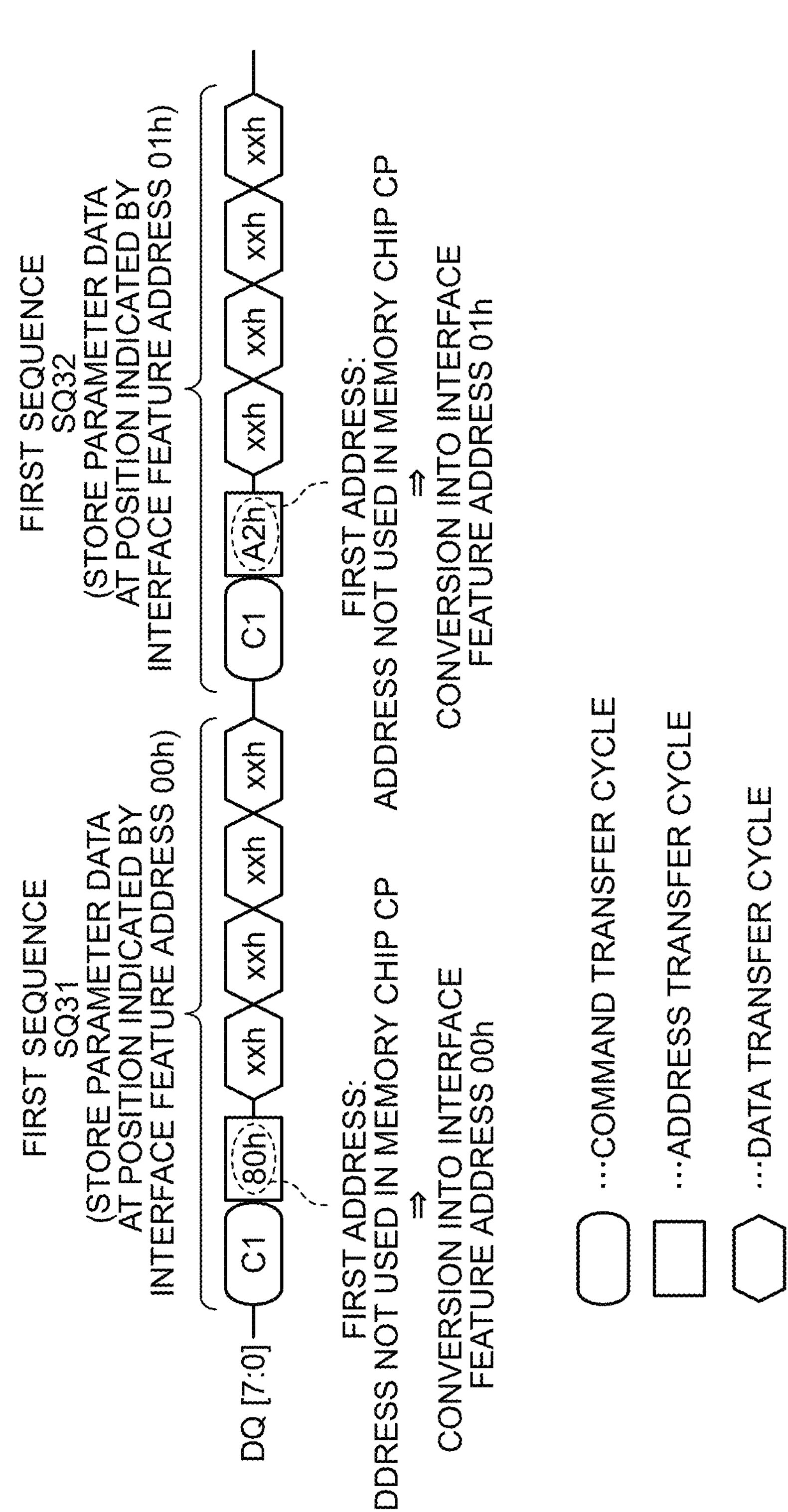
FIG. 21 is a diagram for describing a method of setting parameter data according to the fourth embodiment using the first sequence.

FIG. 21 is a diagram for describing a method of setting parameter data according to the fourth embodiment using the first sequence.

In the example illustrated in FIG. 21, the memory controller MC transfers a first sequence SQ31 and a first sequence SQ32 to the semiconductor memory device 1 in this order.

The first sequence SQ31 includes an address 80h, which is an address not used in the memory chip CP, as a first address. When the interface chip IFC receives the first sequence SQ31, the command decoder 111*c* determines whether or not the first address is correlated with any interface feature address by referring to the conversion table 120*c*. According to the example illustrated in FIG. 20, the address 80h is correlated with the interface feature address 00h. Therefore, the command decoder 111*c* stores the parameter data included in the first sequence SQ31 at the position indicated by the interface feature address 00h in the feature register group 112*c*.

The first sequence SQ32 includes an address A2h, which is an address not used in the memory chip CP, as a first address. When the interface chip IFC receives the first sequence SQ31, the command decoder 111*c* determines whether or not the first address is correlated with any interface feature address by referring to the conversion table 120*c*. According to the example illustrated in FIG. 20, the address A2h is correlated with the interface feature address 01h. Therefore, the command decoder 111*c* stores the parameter data included in the first sequence SQ32 at the position indicated by the interface feature address 01h in the feature register group 112*c*.

Figure 22:
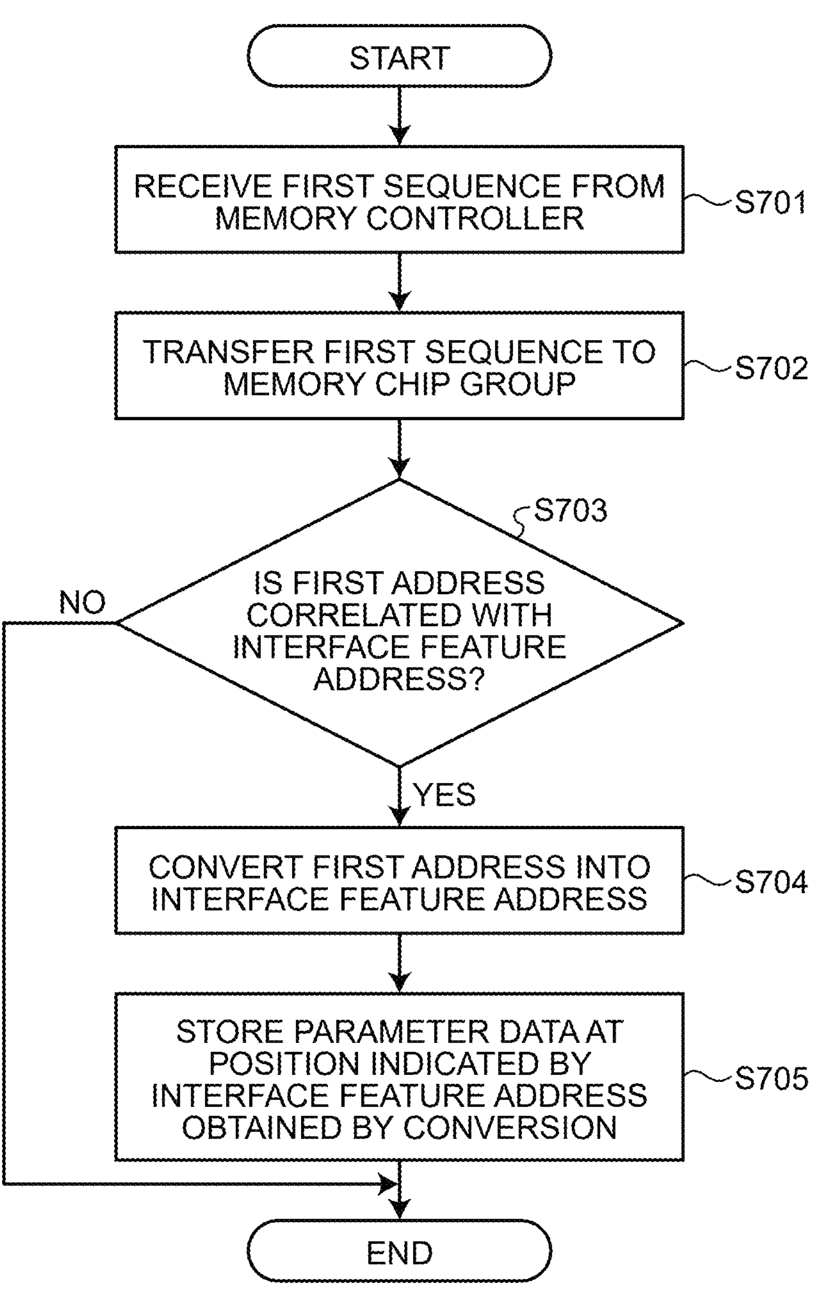
FIG. 22 is a flowchart illustrating an example of the operation of the interface chip according to the fourth embodiment.

FIG. 22 is a flowchart illustrating an example of the operation of the interface chip IFC according to the fourth embodiment.

When the interface chip IFC receives the first sequence from the memory controller MC (S701), the controller 103 transfers the received first sequence to the memory chip CP group (S702).

The command decoder 111*c* determines whether or not the first address included in the received first sequence is correlated with the interface feature address by the conversion table 120*c* (S703).

In a case where the first address is correlated with the interface feature address (S703: Yes), the command decoder 111*c* converts the first address into the interface feature address (S704). In S704, the command decoder 111*c* identifies the interface feature address corresponding to the first address by referring to the conversion table 120*c*.

The command decoder 111*c* stores the parameter data included as setting data in the first sequence at the position indicated by the interface feature address obtained by the conversion in the feature register group 112*c* (S705). The command decoder 111*c* stores the parameter data in the storage area, which is indicated by the interface feature address obtained by the conversion, among the 32 storage areas included in the feature register group 112*c*.

In a case where the first address is not correlated with the interface feature address (S703: No), or after S705, the interface chip IFC ends the operation.

Figure 23:
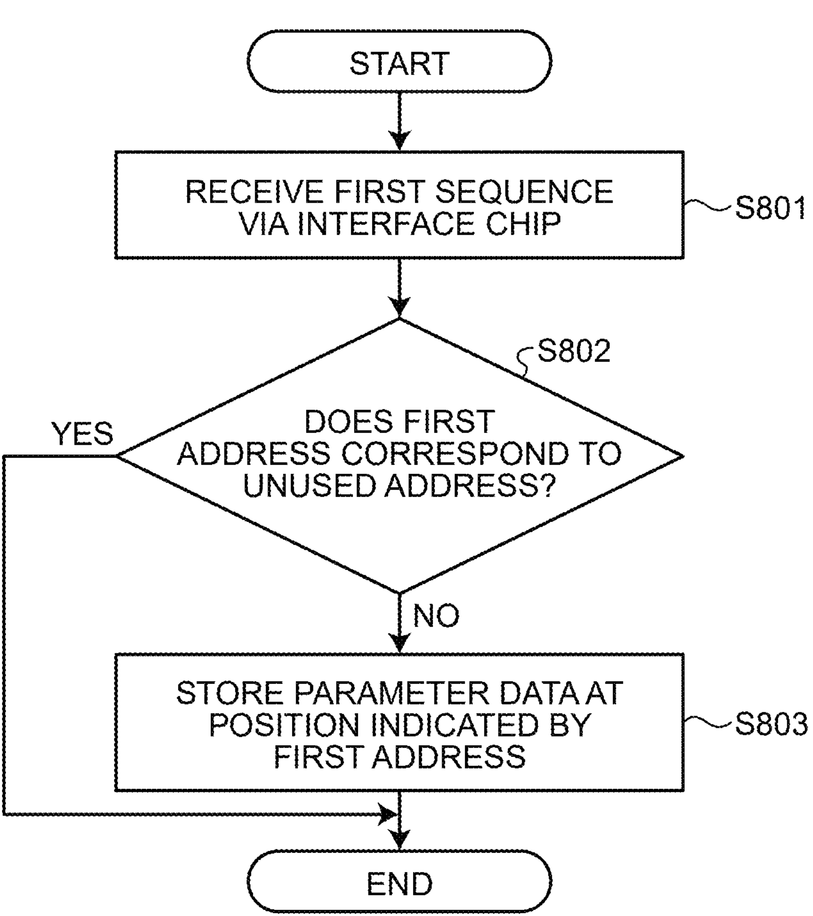
FIG. 23 is a flowchart illustrating an example of the operation of the memory chip according to the fourth embodiment.

FIG. 23 is a flowchart illustrating an example of the operation of the memory chip CP according to the fourth embodiment. Also in this figure, the operation of one memory chip CP will be described as a representative of all the memory chips CP.

When the memory chip CP receives the first sequence via the interface chip IFC (S801), the access circuit 202*c* determines whether or not the first address included in the received first sequence corresponds to an unused address (S802).

In a case where the first address does not correspond to an unused address (S802: No), the access circuit 202*c* stores the parameter data included as setting data in the first sequence at the position indicated by the first address in the feature register group 203*c* (S803).

In a case where the first address corresponds to an unused address (S802: Yes), or after S803, the memory chip CP ends the operation.

Note that, in the description of the fourth embodiment, an example in which the first sequence is used as the command sequence for transferring the SetFeature command has been described. Even when the second sequence is received, the semiconductor memory device 1 can execute the same operation (for example, the operation illustrated in FIG. 22) as that when the first sequence is received.

As described above, according to the fourth embodiment, the first address included in the command sequence of the SetFeature command is included in either a space (referred to as a first space) used for access to the feature register group 203*c* or a space (referred to as a second space) used for access to the feature register group 112*c,* which is exclusive of the first space. In the conversion table 120*c,* a correspondence between the address group included in the second space and the feature register group 112*c* is recorded. When the first address is included in the first space, the memory chip CP stores the parameter data included in the command sequence in the feature register group 203*c*. When the first address is not included in the first space, the memory chip CP does not store the parameter data in the feature register group 203*c*. When the first address is included in the second space, the interface chip IFC stores the parameter data included in the command sequence in the feature register group 112*c*. When the first address is not included in the second space, the interface chip IFC does not store the parameter data in the feature register group 112*c*.

The addresses that are not used in the memory chip CP in the feature register space can be used in the interface chip IFC. Therefore, the number of addresses for the interface chip IFC can be increased as much as possible without reducing the number of addresses used in the memory chip CP. In other words, the parameter data can be suitably stored in the feature register group 112*c* included in the interface chip IFC.

Moreover, according to the fourth embodiment, the feature register group 112*c* includes plural storage areas (32 storage areas in the example illustrated in FIG. 19), and the second space includes plural addresses (32 addresses in the example illustrated in FIG. 19). In the conversion table 120*c,* a correspondence between the plural addresses included in the second space and the plural storage areas included in the feature register group 112*c* is recorded. When the first address is included in the second space, the interface chip IFC stores the parameter data included in the command sequence in the storage area correlated with the first address by the conversion table 120*c,* among the plural storage areas included in the feature register group 112*c*.

Therefore, an address that is not used in the memory chip CP in the feature register space can be used in the interface chip IFC.

Fifth Embodiment

In the command sequence of the SetFeature command, the setting data is transferred in four cycles of data transfer. In other words, the command sequence of the SetFeature command includes four 8-bit data transfer fields (data transfer fields B0 to B3 to be described later), and the memory controller MC can transfer parameter data in 8-bit (=1 Byte) units per one address. Plural storage areas each having a storage capacity of 32 bits (=4 Bytes) included in the feature register group of the memory chip CP can be considered to include four Byte areas each capable of storing 1-Byte parameter data that is transferred in one data transfer field. Moreover, each of the 256 addresses included in the feature register space can be considered to include four segments corresponding to four Byte areas.

The plural storage areas included in the feature register group of the memory chip CP may include a storage area having an unused Byte area.

In the fifth embodiment, a space corresponding to an unused Byte area in the feature register space may be used in the interface chip IFC. In other words, from among 1024 segments (=256 addresses×4 segments) included in the feature register space, a group of segments not used in the memory chip CP may be used in the interface chip IFC.

The fifth embodiment will be described below. In the fifth embodiment, contents different from the fourth embodiment will be described. The same contents as in the fourth embodiment will not be described or will be described in a simplified manner.

FIG. 24 is a diagram for describing an example of the configuration of the interface chip IFC and each of the memory chips CP according to the fifth embodiment.

The controller 103 of the interface chip IFC includes a command decoder 111*d* instead of the command decoder 111*c*. The controller 103 also includes a feature register group 112*d* instead of the feature register group 112*c*.

The feature register group 112*d* includes 32 storage areas to which different addresses in the range of 00h to 1Fh are given. Each of the 32 storage areas has a storage capacity of 32 bits (=4 Bytes). In the fifth embodiment, the 32 addresses in the range of 00h to 1Fh assigned to the feature register group 112*d* are referred to as interface feature addresses.

The controller 103 further includes a memory 113*d*. The memory 113*d* is a nonvolatile memory in which a conversion table 120*d* is stored. The memory 113*d* is, for example, an eFuse or a ROM. The conversion table 120*d* is stored in the memory 113*d* at the time of manufacturing the semiconductor memory device 1. Note that the type of the memory 113*d* and the timing of storing the conversion table 120*d* are not limited thereto.

Each of the memory chips CP includes an access circuit 202*d* instead of the access circuit 202*c*. Each of the memory chips CP also includes a feature register group 203*d* instead of the feature register group 203*c*.

The feature register group 203*d* includes 256 storage areas to which different addresses in the range of 00h to FFh are given. Each of the 256 storage areas provided in the feature register group 203*d* has a storage capacity of 32 bits (=4 Bytes).

In the example illustrated in FIG. 24, each of 32 storage areas among 256 storage areas included in the feature register group 203*d* includes one or more unused Byte areas. The total capacity of the unused Byte areas included in the feature register group 203*d* is 64 Bytes.

The 32 addresses assigned to the 32 storage areas including one or more unused Byte areas are correlated with the 32 storage areas included in the feature register group 112*d* of the interface chip IFC by the conversion table 120*d*. Further, in the conversion table 120*d*, the position of each unused Byte area is recorded.

Figures 25, 26:
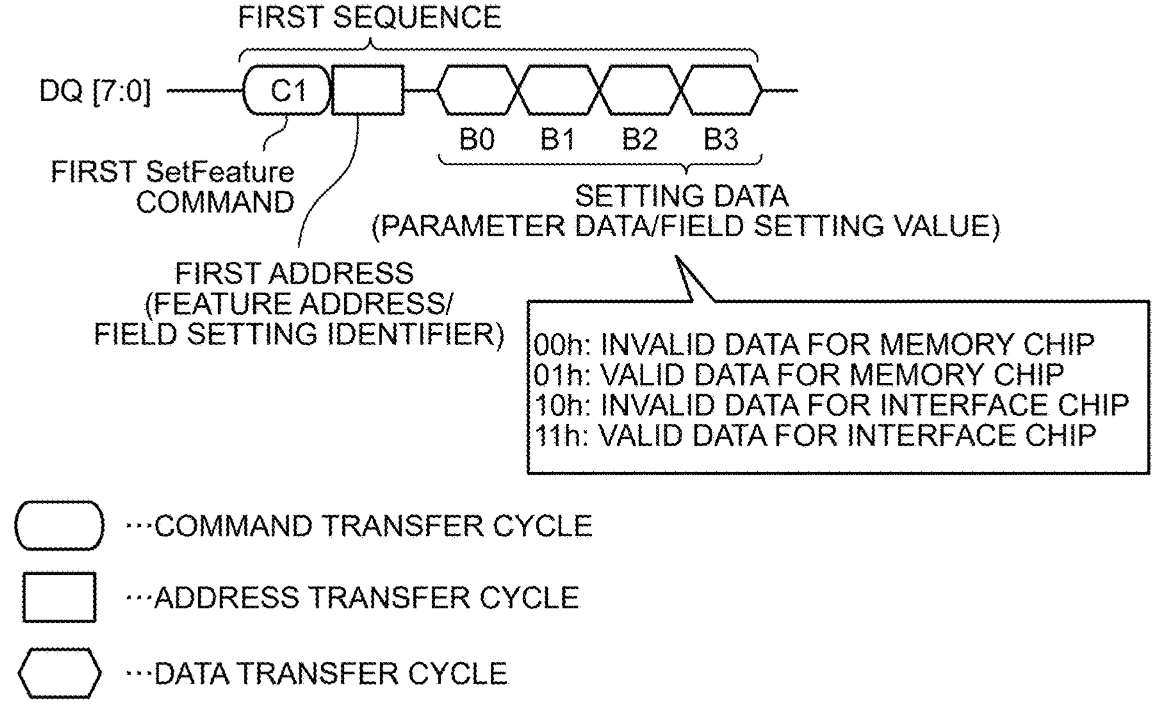
FIG. 25 is a diagram illustrating an example of a configuration of a conversion table according to the fifth embodiment.
FIG. 26 is a diagram illustrating a configuration of a first sequence according to the fifth embodiment.

FIG. 25 is a diagram illustrating an example of the configuration of the conversion table 120*d* according to the fifth embodiment.

In the conversion table 120*d*, a correspondence between an address given to a storage area including an unused Byte area among 256 addresses that can be transferred as the first address and an interface feature address is recorded.

Additionally, in the conversion table 120*d*, the position of the unused Byte area is recorded for each address assigned to the storage area including the unused Byte area among the 256 addresses that can be transferred as the first address.

As described above, the command sequence of the Set-Feature command includes four data transfer fields B0 to B3 in each of which 1-Byte parameter data is transferred. In FIG. 25, the position of an unused Byte area in a 32-bit storage area is represented by a flag in units of data transfer fields. A flag value "1" refers to an unused Byte area, and a flag value "0" refers to a used Byte area.

In the example illustrated in FIG. 25, the address 80h is correlated with the interface feature address 00h, and the flag is set to "1" for the data transfer fields B2 and B3 of the data transfer fields B0 to B3. This means that the third Byte area and the fourth Byte area out of the four Byte areas included in the storage area to which the address 80h included in the feature register group 203*d* is assigned are unused Byte areas.

The address A2h is also correlated with the interface feature address 01h, and the flag is set to "1" for the data transfer field B1 of the data transfer fields B0 to B3. This means that the first Byte area out of the four Byte areas included in the storage area to which the address A2h included in the feature register group 203*d* is assigned is an unused Byte area.

As described above, in the conversion table 120*d*, a correspondence between the space, which is not used in the memory chips CP in the feature register space, and the feature register group 112*d* is recorded in a unit of the Byte area, namely, in a unit of the segment that is the address space corresponding to the Byte area.

FIG. 26 is a diagram illustrating the configuration of the first sequence according to the fifth embodiment.

The first sequence is configured such that the first Set-Feature command C1, the first address, and the setting data are transferred in this order. The first sequence includes the data transfer fields B0 to B3, and the setting data is transferred in 1-Byte units by the data transfer fields B0 to B3.

Any of the addresses corresponding to the feature address and the field setting identifier can be transferred as the first address. The field setting identifier is a specific address out of 256 types of feature addresses. The command decoder 111*d* interprets the field setting identifier as a command for setting the target of 4-Byte parameter data transferred by the data transfer fields B0 to B3.

As the setting data, in addition to the parameter data, a field setting value may be transferred for each data transfer field. The field setting value indicates the target of the parameter data and whether the parameter data is valid or invalid.

In the example illustrated in FIG. 26, the field setting value may take 00h, 01h, 10h, and 11h.

The field setting value 00h refers to invalid data for the memory chip CP. When the field setting value 00h is transferred in a certain data transfer field, the parameter data that is subsequently transferred in the data transfer field is parameter data targeting the memory chip CP and is invalid data.

The field setting value 01h refers to valid data for the memory chip CP. When the field setting value 01h is transferred in a certain data transfer field, the parameter data that is subsequently transferred in the data transfer field is parameter data targeting the memory chip CP and is valid data.

The field setting value 10h refers to invalid data for the interface chip IFC. When the field setting value 10h is transferred in a certain data transfer field, the parameter data that is subsequently transferred in the data transfer field is parameter data targeting the interface chip IFC and is invalid data.

The field setting value 11h refers to valid data for the interface chip IFC. When the field setting value 11h is transferred in a certain data transfer field, the parameter data that is subsequently transferred in the data transfer field is parameter data targeting the interface chip IFC and is valid data.

Figure 27:
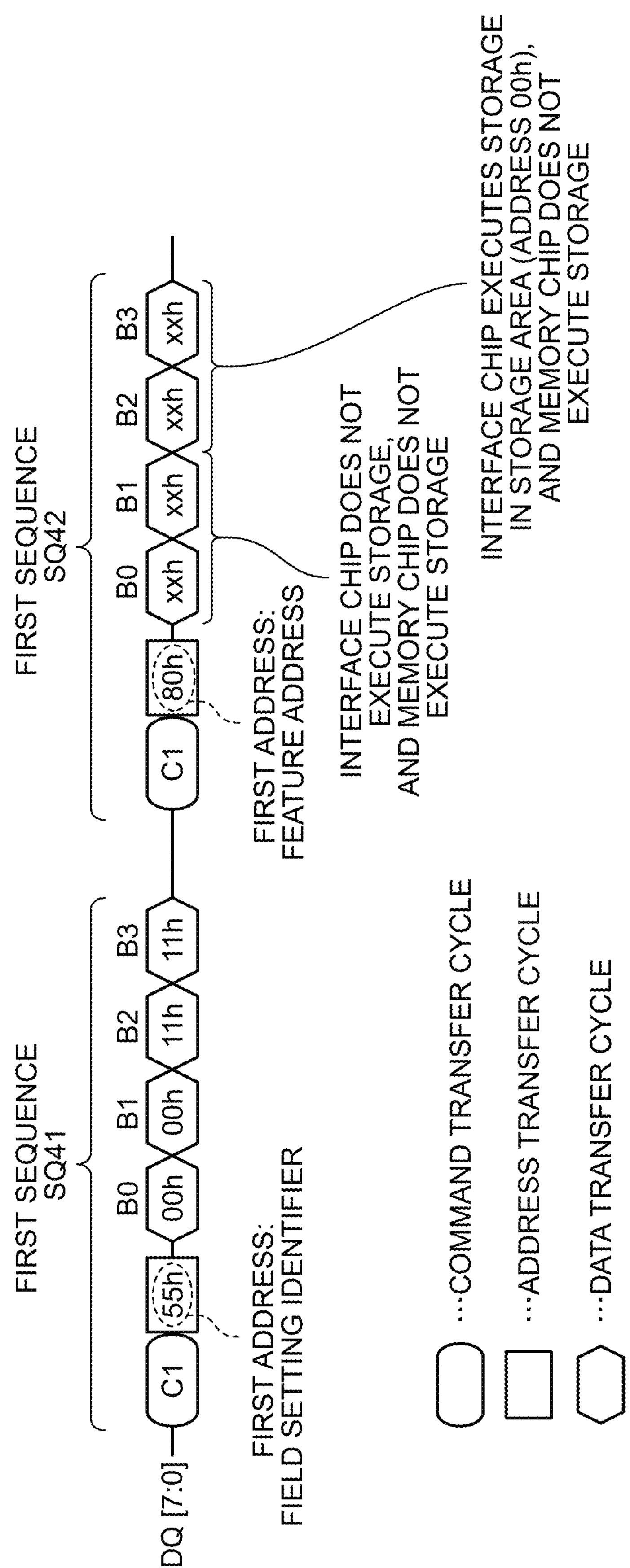
FIG. 27 is a diagram for describing a method of setting parameter data according to the fifth embodiment using the first sequence.

FIGS. 27 and 28 are diagrams for describing a method of setting parameter data according to the fifth embodiment using the first sequence.

In the example illustrated in FIG. 27, the memory controller MC transfers a first sequence SQ41 and a first sequence SQ42 to the semiconductor memory device 1 in this order.

The first sequence SQ41 includes a field setting identifier as a first address. In this example, the address 55h is used as a field setting identifier. When the first sequence SQ41 is received, the interface chip IFC and each of the memory chips CP recognize that the field setting value is transferred in each of the data transfer fields B0 to B3 because the field setting identifier is included in the first sequence SQ41.

In the first sequence SQ41, the field setting value 00h is transferred by each of the data transfer fields B0 and B1. Therefore, the interface chip IFC and each of the memory chips CP recognize that the parameter data that is subsequently transferred in the data transfer fields B0 and B1 is parameter data targeting the memory chip CP and is invalid data.

Moreover, in the first sequence SQ41, the field setting value 11h is transferred in each of the data transfer fields B2 and B3. Therefore, the interface chip IFC and each of the memory chips CP recognize that the parameter data that is subsequently transferred in the data transfer fields B2 and B3 is parameter data targeting the interface chip IFC and is valid data.

The first sequence SQ42 includes the feature address 80h as a first address. In the interface chip IFC and each of the memory chips CP, the following operation is executed based on each of the field setting values included in the first sequence SQ41 transferred in advance. Specifically, the interface chip IFC and the memory chip CP do not store the parameter data that is transferred in the data transfer fields B0 and B1 included in the first sequence SQ42 in the feature register groups 112*d* and 203*d*. The parameter data that is transferred in the data transfer fields B2 and B3 included in the first sequence SQ42 is stored, in the interface chip IFC, in the feature register group 112*d*. Note that the feature address 80h is correlated with the interface feature address 00h by the conversion table 120*d*. Therefore, the parameter data that is transferred in the data transfer fields B2 and B3 included in the first sequence SQ42 is stored in the storage area to which the interface feature address 00h in the feature register group 112*d* is given. In each of the memory chips CP, the parameter data that is transferred in the data transfer fields B2 and B3 included in the first sequence SQ42 is not stored in the feature register group 203*d*.

In the example illustrated in FIG. 28, the memory controller MC transfers a first sequence SQ51 and a first sequence SQ52 to the semiconductor memory device 1 in this order.

The first sequence SQ51 includes a field setting identifier as a first address. When the first sequence SQ51 is received, the interface chip IFC and each of the memory chips CP recognize that the field setting value is transferred in each of the data transfer fields B0 to B3 because the field setting identifier is included in the first sequence SQ51.

In each of the data transfer fields B0 and B1 of the first sequence SQ51, the field setting value 01h is transferred. Therefore, the interface chip IFC and the memory chip CP recognize that the parameter data that is subsequently transferred in the data transfer fields B0 and B1 is parameter data targeting the memory chip CP and is valid data.

In each of the data transfer fields B2 and B3 of the first sequence SQ51, the field setting value 10h is transferred. Therefore, the interface chip IFC and the memory chip CP recognize that the parameter data that is subsequently transferred in the data transfer fields B2 and B3 is parameter data targeting the interface chip IFC and is invalid data.

The first sequence SQ52 includes a feature address 80h as a first address. In the interface chip IFC and each of the memory chips CP, the following operation is executed based on each of the field setting values included in the first sequence SQ51 transferred in advance. Specifically, the interface chip IFC does not store, in the feature register group 112*d*, the parameter data that is transferred in the data transfer fields B0 and B1 included in the first sequence SQ52. In each of the memory chips CP, the parameter data that is transferred in the fields B0 and B1 is stored in the storage area to which the feature address 80h in the feature register group 203*d* is assigned. In the interface chip IFC and each of the memory chips CP, the parameter data that is transferred in the data transfer fields B2 and B3 included in the first sequence SQ52 is not stored in the feature register groups 112*d* and 203*d*.

Figure 29:
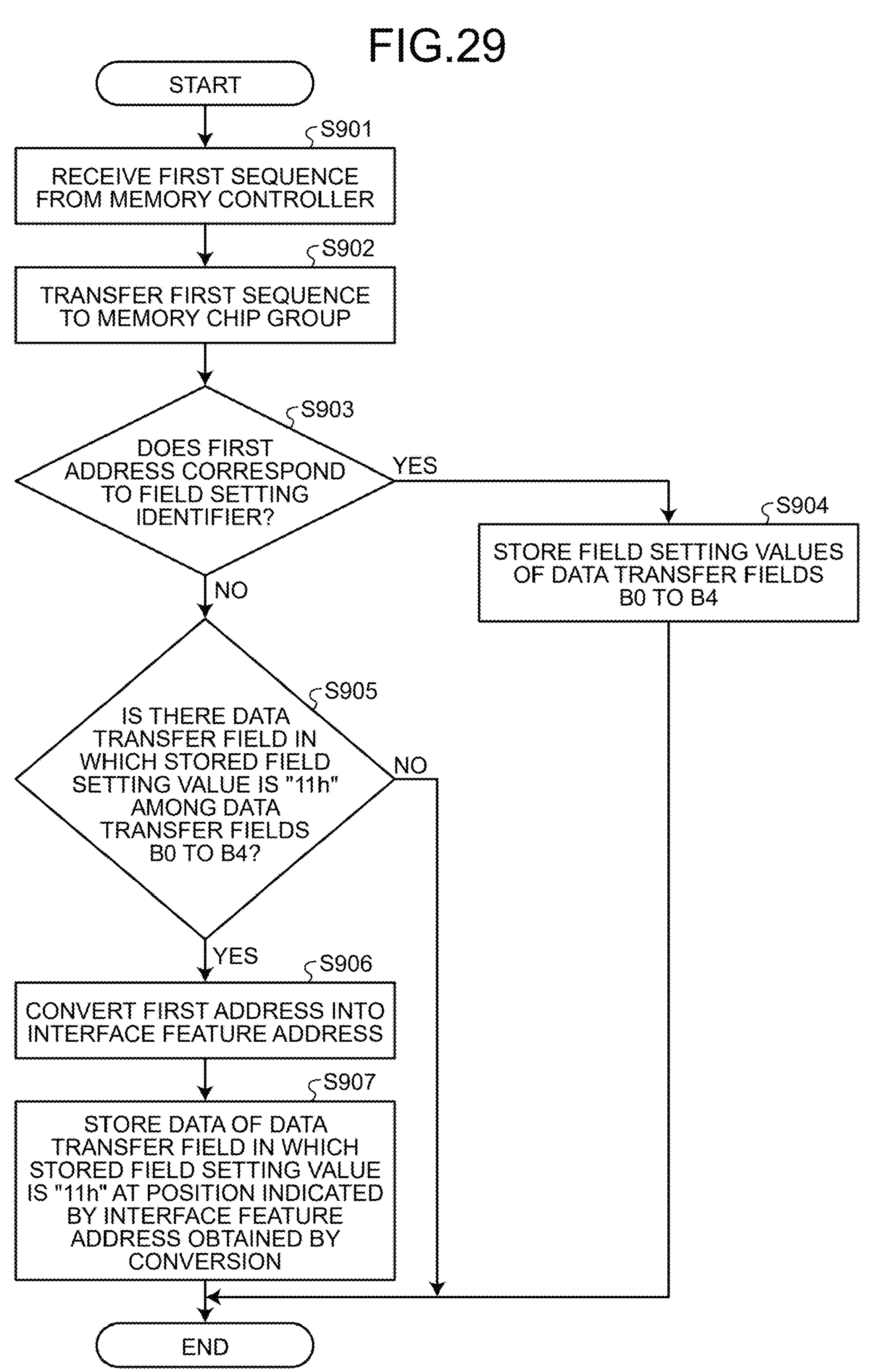
FIG. 29 is a flowchart illustrating an example of the operation of the interface chip according to the fifth embodiment.

FIG. 29 is a flowchart illustrating an example of the operation of the interface chip IFC according to the fifth embodiment.

When the interface chip IFC receives the first sequence from the memory controller MC (S901), the controller 103 transfers the received first sequence to the memory chip CP group (S902).

The command decoder 111*d* determines whether or not the first address included in the received first sequence corresponds to the field setting identifier (S903). In a case where the first address corresponds to the field setting identifier (S903: Yes), the command decoder 111*d* stores the field setting values of the data transfer fields B0 to B3 included in the received first sequence (S904).

In a case where the first address included in the received first sequence does not correspond to the field setting identifier (S903: No), the command decoder 111*d* determines whether or not there is a data transfer field in which the stored field setting value is "11h" among the data transfer fields B0 to B3 (S905).

In a case where there is a data transfer field in which the field setting value is "11h" (S905: Yes), the command decoder 111*d* converts the first address into an interface feature (S906). The command decoder 111*d* identifies the interface feature address correlated with the first address by referring to the conversion table 120*d*.

The command decoder 111*d* stores the data of the data transfer field, which is the stored field setting value "11h", at the position indicated by the interface feature address obtained by the conversion in the feature register group 112*d* (S907).

After S904, or in a case where there is no data transfer field in which the field setting value is "11h" (S905: No), or after S907, the interface chip IFC ends the operation.

Figure 30:
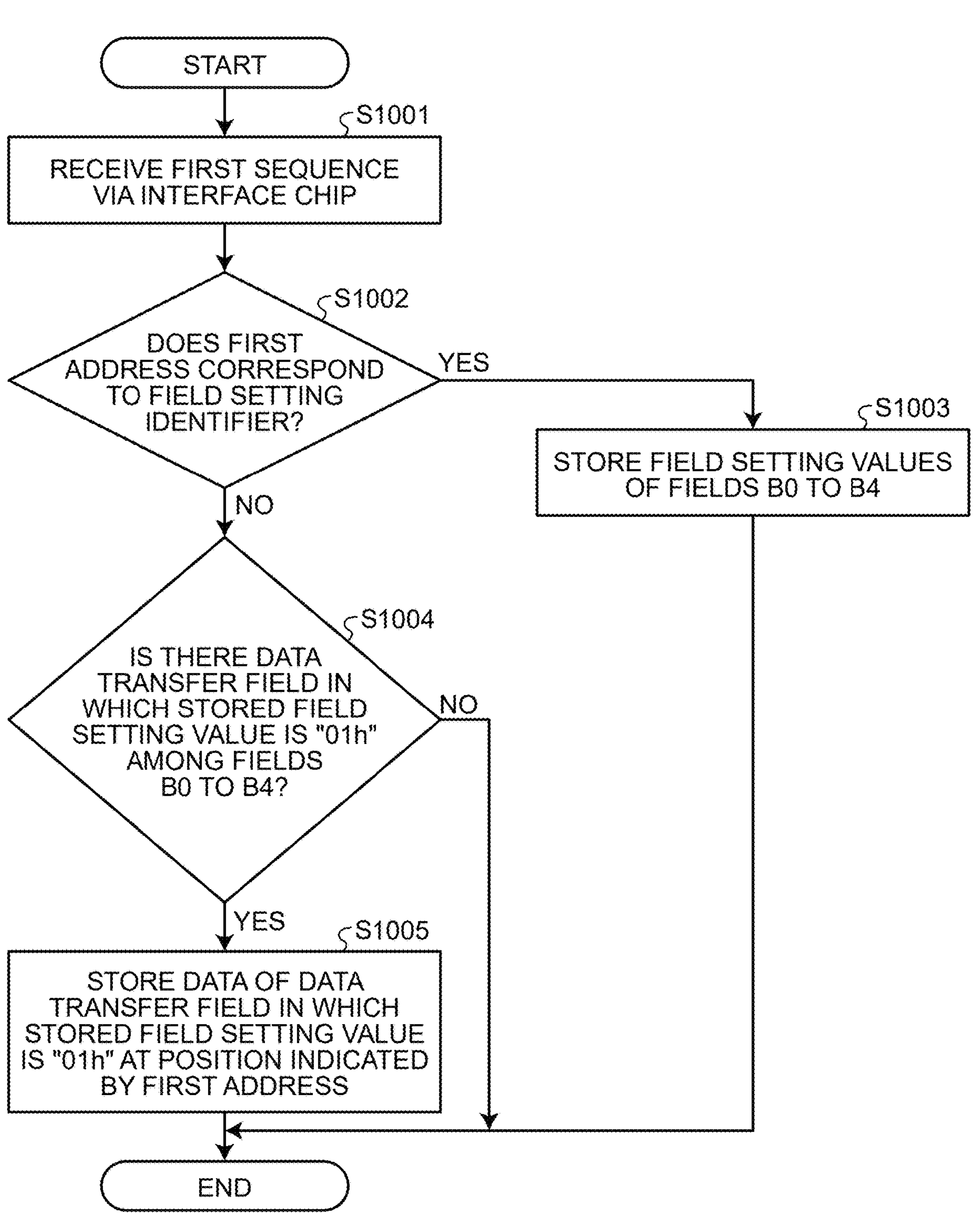
FIG. 30 is a flowchart illustrating an example of the operation of the memory chip according to the fifth embodiment.

FIG. 30 is a flowchart illustrating an example of the operation of the memory chip CP according to the fifth embodiment. Also in this figure, the operation of one memory chip CP will be described as a representative of all the memory chips CP.

When the memory chip CP receives the first sequence via the interface chip IFC (S1001), the access circuit 202*d* determines whether or not the first address included in the received first sequence corresponds to the field setting identifier (S1002). In a case where the first address corresponds to the field setting identifier (S1002: Yes), the access circuit 202*d* stores the field setting values of the data transfer fields B0 to B3 included in the received first sequence (S1003).

In a case where the first address included in the received first sequence does not correspond to the field setting identifier (S1002: No), the access circuit 202*d* determines whether or not there is a data transfer field in which the stored field setting value is "01h" among the data transfer fields B0 to B3 (S1004).

In a case where there is a data transfer field in which the field setting value is "01h" (S1004: Yes), the access circuit 202*d* stores the data of data transfer field in which the stored field setting value is "01h" at the position indicated by the first address in the feature register group 203*d* (S1005).

After S1003, or in a case where there is no data transfer field in which the field setting value is "01h" (S1004: No), or after S1005, the memory chip CP ends the operation.

Note that, in the above description, the transfer of the field setting value and the transfer of the parameter data are executed using the first sequence. The fifth embodiment can also be implemented by using the second sequence instead of the first sequence or in addition to the first sequence.

Moreover, the semiconductor memory device 1 is configured such that whether the target of the data that is transferred in each data transfer field is the interface chip IFC or each of the memory chips CP is set using the field setting value.

The method for switching the storage destination of parameter data in units of data transfer fields is not limited thereto.

In one example, the memory controller MC may read the parameter data in units of a 32-Bit storage area by using a GetFeature command, and then the memory controller MC may transfer the parameter data in a read-modify-write format by using the SetFeature command.

As described above, according to the fifth embodiment, plural segments (four segments in the above example) are included in each feature address, and in the interface chip IFC, a space that is not used in the memory chip CP can be used in units of segments. In other words, in the interface chip IFC, a group of segments exclusive of a group of segments used in the memory chip CP is used.

A segment that is not used in the memory chip CP in the feature register space can be used in the interface chip IFC. The space for the interface chip IFC can be increased as much as possible without reducing the space used in the memory chip CP in the feature register space. In other words, parameter data can be suitably stored in the feature register group 112*d* included in the interface chip IFC.

Note that the fourth embodiment and the fifth embodiment can be applied together with the first embodiment or the second embodiment.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:

a terminal group to which a command sequence of a setting command is input, the command sequence including an address;

a first device including a first register group to which a first address space is mapped and a memory cell array, the first device being configured to store parameter data in the first register group when the address is included in the first address space, and not store the parameter data in the first register group when the address is not included in the first address space; and a second device provided between the terminal group and the first device, the second device including a second register group, the second register group including multiple pages to which common second address spaces exclusive of the first address space are mapped, the second device being configured to identify, based on the command sequence, a storage destination page of the parameter data from among the multiple pages when the address is a first value.

2. The semiconductor memory device according to claim 1, wherein the command sequence of the setting command includes data in addition to the address, the first value is included in the common second address spaces, and the second device is configured to identify one of the multiple pages based on data included in a first command sequence when the first command sequence is received via the terminal group, the setting command comprising the first command sequence and the first value, and, store, as the parameter data, data included in a second command sequence when the second command sequence is received via the terminal group after the first command sequence, the data included in the second command sequence being stored at a position that is indicated by a second value and is in the identified one of the multiple pages, the second value being different from the first value and being included in the second address space, the setting command comprising the second command sequence and the second value.

3. The semiconductor memory device according to claim 1, wherein the first device is given a logical unit number (LUN), the command sequence of the setting command includes the parameter data in addition to the address, the address includes a first address included in either the first address space or the second address space, and includes a second address to which the LUN can be designated, the first value is one of values that are correlated with each of different pages of the multiple pages, and the second device is configured to interpret the second address as the first value when the first address is included in the second address space, and store the parameter data at a position indicated by the first address, the position being located in a page corresponding to the first value out of the multiple pages.

4. The semiconductor memory device according to claim 1, wherein the first device is given a logical unit number (LUN), the first value is one of values exclusive of the LUN that are correlated with each of different pages of the multiple pages, the command sequence of the setting command includes the parameter data in addition to the address, the address includes a first address included in either the first address space or the second address space, and includes a second address to which the LUN or the first value can be designated, and the second device is configured to store the parameter data at a position indicated by the first address when the second address is the first value, the position being located in a page corresponding to the first value out of the multiple pages.

5. The semiconductor memory device according to claim 1, wherein the setting command is a SetFeature command.

6. A memory system comprising:

the semiconductor memory device according to claim 1; and a memory controller configured to transmit the command sequence of the setting command to the semiconductor memory device.

7. A memory system comprising:

the semiconductor memory device according to claim 2; and a memory controller configured to transmit the command sequence of the setting command to the semiconductor memory device.

8. A memory system comprising:

the semiconductor memory device according to claim 3; and a memory controller configured to transmit the command sequence of the setting command to the semiconductor memory device.

9. A memory system comprising:

the semiconductor memory device according to claim 4; and a memory controller configured to transmit the command sequence of the setting command to the semiconductor memory device.

10. A memory system comprising:

the semiconductor memory device according to claim 5; and a memory controller configured to transmit the command sequence of the setting command to the semiconductor memory device.

11. A semiconductor memory device comprising:

a terminal group to which a command sequence of a setting command is input, the command sequence including an address included in a first address space;

a first device including a first register group and a memory cell array; and a second device provided between the terminal group and the first device, the second device including a second register group and a memory in which first information has been stored, wherein the first address space includes a first space and a second space exclusive of the first space, the first space being used for access to the first register group, the second space being used for access to the second register group, the first information is information in which a correspondence between the second space and the second register group is recorded, the first device is configured to store parameter data in the first register group when the address is included in the first space, and not store the parameter data in the first register group when the address is not included in the first space, and the second device is configured to store the parameter data in the second register group when the address is included in the second space, and not store the parameter data in the second register group when the address is not included in the second space.

12. The semiconductor memory device according to claim 11, wherein the second register group includes plural storage areas, the second space includes plural first addresses, the first information includes a correspondence between the plural first addresses and the plural storage areas, and the second device is configured to, when the address is one of the plural first addresses, store the parameter data in a storage area correlated with the address by the first information out of the plural storage areas.

13. The semiconductor memory device according to claim 12, wherein the first address space includes third spaces with which second addresses are correlated, each of the third spaces includes segments, and the first space and the second space are constituted by mutually exclusive segment groups.

14. The semiconductor memory device according to claim 11, wherein the setting command is a SetFeature command.

15. A memory system comprising:

the semiconductor memory device according to claim 11; and a memory controller configured to transmit the command sequence of the setting command to the semiconductor memory device.

16. A memory system comprising:

the semiconductor memory device according to claim 12; and a memory controller configured to transmit the command sequence of the setting command to the semiconductor memory device.

17. A memory system comprising:

the semiconductor memory device according to claim 13; and a memory controller configured to transmit the command sequence of the setting command to the semiconductor memory device.

18. A memory system comprising:

the semiconductor memory device according to claim 14; and a memory controller configured to transmit the command sequence of the setting command to the semiconductor memory device.

19. A method of controlling a semiconductor memory device, the semiconductor memory device including a terminal group, a first device, and a second device provided between the terminal group and the first device, the terminal group being a terminal group to which a command sequence of a setting command is input, the command sequence including an address, the first device including a first register group to which a first address space is mapped and a memory cell array, the second device including a second register group including multiple pages to which common second address spaces exclusive of the first address space are mapped, the method comprising:

identifying a storage destination page of parameter data from among the multiple pages when the address included in the command sequence received by the second device is a first value, the identifying being performed based on the command sequence.

20. The method according to claim 19, wherein the command sequence of the setting command includes data in addition to the address, the first value is included in the second address space, and the method further comprises processing performed by the second device, the processing including:

identifying one of the multiple pages based on data included in a first command sequence in response to receiving the first command sequence via the terminal group, the setting command comprising the first command sequence and the first value; and storing, as the parameter data, data included in a second command sequence in response to receiving the second command sequence via the terminal group after the first command sequence, the data included in the second command sequence being stored at a position that is indicated by a second value and is in the identified one of the multiple pages, the second value being different from the first value and being included in the second address space, the setting command comprising the second command sequence and the second value.

* * * * *